US012064394B1

(12) United States Patent
Ward et al.

(10) Patent No.: US 12,064,394 B1
(45) Date of Patent: Aug. 20, 2024

(54) CONVENIENCE KIT METHODS FOR STERILIZING RAW HAZARDOUS MEDICINE

(71) Applicant: Thorne Intellectual Property Holdings, LLC, Bountiful, UT (US)

(72) Inventors: Matthew Stephen Ward, Orem, UT (US); Gale Harrison Thorne, Bountiful, UT (US); Gale Harrison Thorne, Jr., Bountiful, UT (US)

(73) Assignee: THORNE INTELLECTUAL PROPERTY HOLDINGS, LLC

( * ) Notice: Subject to any disclaimer, the term of this patent is extended or adjusted under 35 U.S.C. 154(b) by 12 days.

(21) Appl. No.: 18/445,305

(22) Filed: Jun. 26, 2023

Related U.S. Application Data

(63) Continuation-in-part of application No. 17/803,989, filed on Feb. 21, 2023, now abandoned.

(51) Int. Cl.

| | |
|---|---|
| ***A61J 1/14*** | (2023.01) |
| ***A61J 1/20*** | (2006.01) |
| ***B01L 1/04*** | (2006.01) |
| ***B01L 3/00*** | (2006.01) |

(52) U.S. Cl.
CPC ........... *A61J 1/1456* (2015.05); *A61J 1/2003* (2015.05); *B01L 1/04* (2013.01); *B01L 3/502* (2013.01); *B01L 2200/141* (2013.01); *B01L 2300/0681* (2013.01)

(58) Field of Classification Search
CPC .............................. A61J 1/1456; A61J 1/2003
See application file for complete search history.

(56) References Cited

U.S. PATENT DOCUMENTS

| | | | | | |
|---|---|---|---|---|---|
| 2,896,381 | A * | 7/1959 | Lange | B08B 9/205 65/109 |
| 4,146,153 | A * | 3/1979 | Bailen | A61J 1/2089 222/91 |
| 4,265,760 | A * | 5/1981 | Abel | A61L 2/022 210/321.87 |
| 4,597,945 | A * | 7/1986 | Sugisawa | A23L 3/185 141/82 |
| 8,449,521 | B2 * | 5/2013 | Thorne, Jr. | A61J 1/16 604/407 |
| 9,149,939 | B2 * | 10/2015 | Zambaux | B25J 21/02 |
| 9,937,288 | B2 * | 4/2018 | Wright | A61M 5/14546 |
| 10,166,686 | B1 * | 1/2019 | Dhanjal | B65B 3/003 |
| 10,390,901 | B2 * | 8/2019 | Godfrey | B65D 25/02 |
| 10,555,872 | B1 * | 2/2020 | Thorne | A61J 1/2096 |

(Continued)

*Primary Examiner* — Lucas E. A. Palmer
(74) *Attorney, Agent, or Firm* — Gale H. Thorn

(57) ABSTRACT

Methods and apparatus are disclosed for sterilizing raw hazardous medicine and the filling and capping syringes disposed within closed and sterile plastic bags to provide sterile medical preparations apart from laminar flow hoods and like equipment. Of particular note, such methods are particularly applied to providing syringes filled with sterilized hazardous drugs while reducing concern for unintentional spills and sterilizing medical preparations and filling large numbers of syringes with steps reduced by novel apparatus and methods. Also, a capping plate is disclosed which provides a method for capping a plurality of male syringe luer fittings by a single displacement step followed by facile release of cap and associated syringe from the capping plate for use in a medical procedure.

19 Claims, 20 Drawing Sheets

(56) References Cited

U.S. PATENT DOCUMENTS

| | | | | |
|---|---|---|---|---|
| 10,800,556 | B2 * | 10/2020 | Thorne | A61J 1/05 |
| 10,940,087 | B2 | 3/2021 | Thorne et al. | |
| 11,312,605 | B2 | 4/2022 | Thorne, Jr. et al. | |
| 11,744,564 | B2 * | 9/2023 | Damiano | A61M 39/20 206/438 |
| 2009/0182263 | A1 * | 7/2009 | Burbank | A61M 1/3413 210/767 |
| 2014/0305544 | A1 * | 10/2014 | Chong | A61J 1/20 141/65 |
| 2015/0011963 | A1 * | 1/2015 | Fangrow | A61J 1/1493 604/414 |
| 2016/0015889 | A1 * | 1/2016 | Caquias | A61J 1/10 604/87 |
| 2016/0166760 | A1 * | 6/2016 | Orofino | A61J 1/2096 604/416 |
| 2017/0027817 | A1 * | 2/2017 | Thorne, Jr. | A61J 1/16 |
| 2017/0245956 | A1 * | 8/2017 | Abu-moustafa | A61B 50/30 |
| 2018/0037343 | A1 * | 2/2018 | Procyshyn | B65B 3/003 |
| 2018/0221564 | A1 * | 8/2018 | Patel | B65B 55/06 |
| 2018/0282008 | A1 * | 10/2018 | Diaz Guerrero | B65B 55/027 |
| 2019/0240112 | A1 * | 8/2019 | Okonski-Fernandez | A61B 50/37 |
| 2019/0329196 | A1 * | 10/2019 | Hurst | A61J 1/2003 |
| 2020/0054523 | A1 * | 2/2020 | McDowell | A61J 1/1456 |
| 2020/0130873 | A1 * | 4/2020 | Thorne | B65B 3/04 |
| 2020/0146932 | A1 * | 5/2020 | Schuck | B01D 63/0241 |
| 2020/0337946 | A1 * | 10/2020 | Thorne | A61J 1/16 |
| 2021/0139834 | A1 * | 5/2021 | Raviv | C12M 25/16 |
| 2022/0002133 | A1 * | 1/2022 | Thomas, Jr. | B65D 1/36 |
| 2022/0219842 | A1 * | 7/2022 | Ward | B65B 55/027 |
| 2022/0378656 | A1 * | 12/2022 | McLoughlin | B01F 23/49 |

* cited by examiner

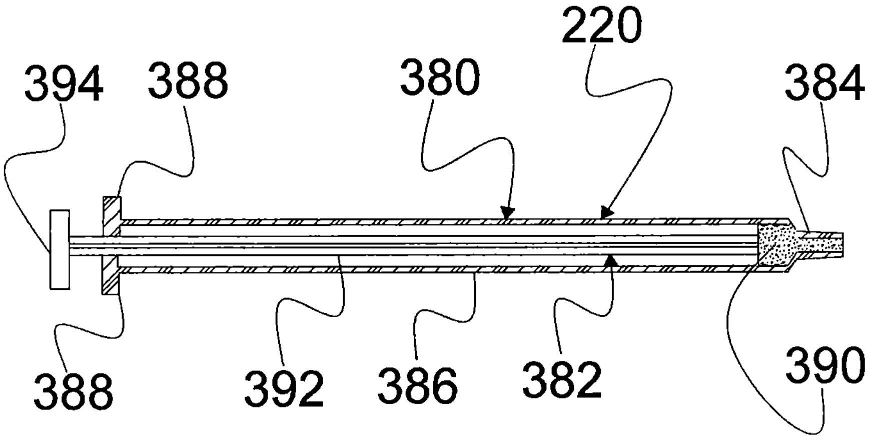
FIG. 24
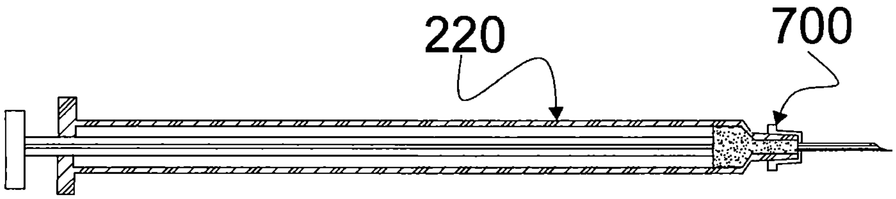
FIG. 48
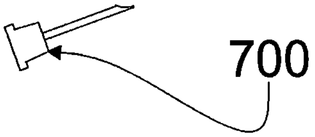
FIG. 49
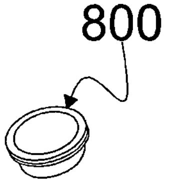
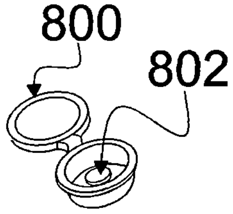
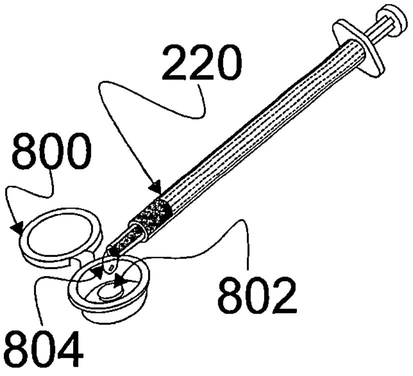
FIG. 50 FIG. 51 FIG. 52

CONVENIENCE KIT METHODS FOR STERILIZING RAW HAZARDOUS MEDICINE

CONTINUATION-IN-PART

This Patent Application is a CONTINUATION-IN-PART of U.S. patent application Ser. No. 17/803,989, titled CONVENIENCE KITS FOR PREPARING STERILE MEDICATIONS.

FIELD OF INVENTION

Inventions disclosed herein relate generally to convenience kits and associated applications for medical procedures involving methods for sterilizing, transferring and capping medical syringes which require sterile conditions in processing, storage and pre-use. Of particular note, the convenience kits and methods of use are applied to steps which can occur in a potentially contaminating environment and still produce a sterile product. Therefore, the field of invention is particularly related to pre-sterilized kits and to methods which employ preassembled parts provided sterilized within the protective enclosure of a closed and sealed apparatus having only a pathway or pathways into the apparatus through sterilizing assemblies. Such apparatus is primarily used for introducing medical product therein, thereby providing a fully prepared sterile preparation without requiring employment of a laminar flow hood or other sterilization assurance level (SAL) product manipulating devices. Such kits, made according to instant inventions disclosed herein, are provided particularly made for preparing drugs which are hazardous and those which can be used in very small doses and which are often very costly. Each convenience kit is a single-use tool which is specifically designed and assembled to be used in preparation of one particular medicine per kit use. Of particular note, inventions disclosed herein are related to methods and apparatus for drawing medicine supplied in bulk in a container such as a medical vial, sterilizing the medicine en route to displacing the medicine into a sterile vessel (which is preferably a medical syringe) for use, while assuring the medicine, being displaced is sterilized and in a closed container before being displaced into a potentially contaminating environment. In general, methods, disclosed herein, are meant to be used for transferring, or, in some way, altering concentration or character of the medicine following known current medicine preparation techniques and not, in any way, for producing a new version of the medicine. As examples, a particular application for the present invention is use in preparing vitreous substitutes and mitomycin in the field of ophthalmology, and for providing a rapid and convenient way of preparing hazardous drugs, especially those which have a short lifetime, with confidence and safety.

DESCRIPTION OF RELATED ART

In current practice, vitreous substitute medicine, usually supplied from a manufacturer in vials, is generally prepared for injection using a laminar flow hood for sterility maintenance. Such practice requires special gowning and technical training to assure that safe and effective levels of sterility are attained, as defined in USP Chapter 797. The following U.S. Pat. Nos. 10,555,872 B2, 10,800,556 B2 and 10,940,087 B2, disclose methods and apparatus for mixing, sterilizing filling vessels sans a laminar flow hood or like equipment. Such methods are taught to employ a convenience kit comprising a bag (a kit bag) in which syringes are disposed to be filled and at least one sterilizing filter assembly affixed to the bag to provide the only pathway into the bag through a sterilizing grade filter for medicine preparation and transit. The bag and associated parts within the bag are pre-sterilized, and remain sterile as medicine is displaced into the bag and into vessels which are capped before the closed bag is opened for access to the vessels and medicine contained therein. However, methods, applications and breadth of scope disclosed and claimed for the instant inventions disclosed herein were neither foreseen nor disclosed in the prior related art.

Table of Definitions

Following is a table of a list of words and phrases with definitions clarifying their use in this document:

- apparatus for controlled access of raw medicine from a source container (access apparatus), n: a combination of devices which provide fluid communication with a source container, permit controlled drawing of a bolus of liquid raw medicine, which may be hazardous, from the source container and delivering all or a portion of the bolus of liquid to a filter assembly.
- at least one, n: one or more.
- cap, n: a device used to cover an otherwise exposed orifice of a syringe or other container to maintain sterility of syringe contents thereby.
- cap plate, n: a device which is designed to hold a plurality of syringe caps and by which caps can be affixed to syringes one at a time.
- catch, n: a stop for securing a plunger rod in place.
- controlled displacement device, n: a device which provides for digital control for drawing raw medicine from a source container and delivering the raw medicine to a filter assembly.
- dose syringe, n: a syringe which is filled with medicine prepared for use in a medical procedure.
- dripless connector, n: a device with a fitting disposed as a communicating link with a receiving container, as an example a syringe, for filling and, thereafter, when detached, does so without spillage of sterilized medicine.
- exterior source assembly, n: an assembly of parts which receives sterile medicine from an external source and is used for providing raw medicine to a filter assembly.
- filling, v: displacement of liquid into a vessel (e.g. a syringe) generally limited to an amount consistent with a desired quantity of medicine to be displaced into the vessel.
- filter, n: a sterilizing filter which is considered to sterilize all fluid which is passed there through, such filters generally have a 0.2 micron filtering capability and so filter all fluids until becoming wet when such a filter will not pass gas. This inherent gas blockage feature is commonly used to test filter efficacy by a “bubble” test performed at the end of a liquid sterilizing medical form.
- filter assembly, n: a fluid transmission assembly, consisting of a filter and other parts, having a purpose of communicating fluid into a kit bag via a pathway such that only raw medicine derived from a source is dispatched as a sterile product to an internal source vessel disposed in a sterile environment inside a kit bag.
- finger flange restraint, n: a planar pattern disposed about a syringe holding well of a tray, the pattern being sized and shaped to capture and hold a finger flange for resisting syringe rotation and displacement from the well.

fishing, v: using multiple attempts to displace an item for insertion which requires precise positioning under conditions which do not permit clear visibility.

fitting, n: a fluid pathway connecting device, generally a luer connector which is well known in medical art.

interior source assembly, n: an assembly of parts from which sterilized medicine can be delivered to dose syringes via a dripless connector which precludes loss due to spillage.

interior source container, n: a container which receives sterile medicine from an external source assembly through a sterilizing filter and is used for transporting sterile medicine to each syringe in the kit bag, such medicine may be drawn into an affixed dose syringe by displacement of the dose syringe plunger; after each syringe draw the container acting to contain gas (air) trapped by luer fitting insertion and, thereby, resulting in only delivering liquid into the dose syringe and receiving and storing all gas associated with the dose syringe/container interface.

interior source assembly, n: an assembly of an interior source container and a dripless connector used for communicating, without spillage, sterilized medicine to dose syringes.

kit bag(bag), n: a plastic bag, being a part of a convenience kit, used for providing a protected space wherein a closed (sterile) environment disposed therein provides for safe and effective preparation of a prescribed medicine, the bag being made from pliant, preferably transparent material which is strong enough to resist rupturing when used as part of the convenience kit and yet sufficiently pliant to provide for manipulation of associated convenience kit devices affixed to and disposed within the bag to be used in a medicine preparation process, the bag, generally, comprising a single hole through which a filter assembly comprising a sterilizing filter communicates sterilized fluid into the bag, the hole being closed and sealed about a portion of the filter assembly by a gasket disposed between a fitting affixed to a part of the filter assembly inside the bag and an exposed surface of the filter exterior to the hole and the bag to assure maintenance of a predetermined SAL within the bag provided by sterilization before use.

latch, n: a stop for securing syringe barrel finger flanges in place.

measurement well, n: a cylindrical structure wherein a dose syringe is disposed for accurate filling, the well comprising a bottom which, in combination with an introductory hole through a surface through which a syringe plunger rod is displaced and a shelf upon which finger flanges are disposed, providing stops which precisely determines dose containment volume of an associated syringe.

plate, n: a planar appliance for holding a plurality of syringe caps in a pattern like an associated array of syringes in a syringe tray for the purpose of facility in capping each syringe.

raw medicine, n: medicine, supplied exterior to the bag, which must be sterilized before use.

SAL, n: Sterility Assurance Level.

stop, n: a feature of a well which precisely limits displacement of a part, such as a plunger rod of a syringe, disposed therein relative to an associated finger flange of the syringe to accurately provide a measurement point for determining volume of liquid communicated into the syringe.

syringe, n: a device used for transferring and displacing fluid in a medical application; each syringe having an elongated and substantially constant diameter hollow barrel having an opening at one end where through a plunger and associated plunger rod are impelled to displace fluid resulting from forceful contact between an end button on the plunger rod and finger flanges disposed about the end opening, the barrel having a spout at the other end, preferably comprising a male luer fitting and an orifice through which the fluid is displaced in communication with the barrel. For constrained and special applications particular specifications may be placed upon the syringe, such as zero dead space or being free of silicone oil.

tray (syringe tray), n: a planar appliance which provides an array of wells wherein syringes are disposed for precisely measured filling and capping.

well, n: a structure which is part of a syringe tray for providing a stable platform for a syringe disposed therein for filling and capping, each well being open at the top, for access.

well array, n: a pattern of wells disposed in a tray wherein a plurality of syringes are disposed.

BRIEF SUMMARY AND OBJECTS OF THE INVENTION

In brief summary, this novel invention alleviates all of the known problems related to providing a convenience kit for sterilizing raw medicine, which may be hazardous, for a medical application as it is drawn from a source container, sterilizing the raw medicine before filling at least one syringe, with the sterile medicine, within a closed and sterile environment and capping each such at least one syringe to assure safety and efficacy of the sterile medicine when accessed for use in a potentially contaminating environment.

Examples of processing steps employed to accomplish steps of sterilizing, filling and capping a single syringe and a plurality of syringes provided in a convenience kit made and used according to the instant invention, are provided hereafter. It should be understood that other processes which accomplish, in any manner, results of the following steps fall within the scope of the instant invention.

Providing Steps:

1. Providing the following items for confining and permitting use of items furnished for accomplishing the purpose of the convenience kit:

a. a plastic bag (kit bag) made of material which is sufficiently transparent for viewing status of items within the kit bag, which can be sealed and sterilized to preserve sterility of items stored within the kit bag and which is sufficiently large, pliant and rugged to permit accomplishing “in-bag” steps without being breached to expose the items to potential contamination when used in a potentially contaminating environment.

b. an exterior (for use outside the kit bag) source syringe or other container along with hazardous drug safety devices which provide an exterior source assembly for accessing raw medicine, which may be hazardous, from a vial or like container which, as needed, being silicone free.

c. a sterilizing grade filter comprising oppositely disposed female and male luer fittings, the male fitting preferably being displaced through a hole in the kit bag for effecting delivery of sterilized medicine there through.

d. raw medicine to be sterilized and to be displaced into a syringe or syringes disposed within the kit bag.

2. Providing the following internally disposed (in-bag) items for accomplishing the purpose of the convenience kit:

a. a gasket which fits snugly about the male male luer filer fitting disposed through the hole in the kit bag.

b. a connector, which, by example, has a female luer connection which, when affixed to the filter male luer fitting of filter, compresses the gasket against associated bag material and disk wall of the filter to assure a singular path through the filter is the only entry for matter into the bag when closed and sealed.

c. a container, being silicone oil free, if needed, which optionally may be a syringe, for providing an interior (in-bag) source of sterilized medicine disposed to receive sterilized product from the sterilizing filter. It should be noted that the interior source container, can be a medical syringe, used directly in a medical procedure, after being capped within the kit bag, for use within the scope of the present invention. However, the scope of the instant invention includes more applications than simply filling one or two dose syringes used directly in a medical procedure. As such, the following items are provided for filling a plurality of dose syringes while deterring spillage of precious or hazardous sterile drug in multiple syringe filling and capping applications.

3. Providing the following additional items for convenience kit applications for filling and capping a plurality of dose syringes:

a. a dripless connector affixed to the interior source container to form an interior source assembly for assuring against loss of sterile medicine due to spillage upon connection disengagement. For example, such can be provided by the dripless connector affixed to the interior source container to, thereby, provide an interface for connecting to both the filter for receiving sterile medicine to be communicated to the interior source vessel and to a syringe spout when communicating sterile medicine into a dose syringe. As an example, a stopcock can be used as the dripless connector, as disclosed in detail hereafter;

b. as needed, a dose syringe tray comprising a plurality of wells for holding uncapped, empty and uncapped dose syringes for being filled with sterile medicine and capped thereafter, the tray also be used for determining dose size and for providing an effective dose syringe interface during filling;

c. a plurality of caps (e.g. one cap for each dose syringe);

d. a plate which holds a plurality of caps, for permitting displacement of a plurality of the caps as a single unit. It is preferred to dispose such a plate in close proximity to dose syringe spouts for ease of displacing caps upon spouts. It is also preferred to provide supporting features within such a plate for aiding in holding dose syringes upright and thereby affixed to the tray; and e. within each well of the syringe tray, providing a releasible finger flange latch for maintaining a dose syringe disposed in the well, upright, and a plunger displacement catch for providing a catch for a plunger rod button of the dose syringe disposed thereat to, thereby, permit barrel displacement to act to communicate fluid between the interior source assembly and an associated dose syringe, and to, as a result, separate and communicate gas trapped, within the affixed interior source and dose syringe fittings into the interior source container, and further providing a stop against plunger rod downward displacement relative to the syringe barrel, to thereby provide for measuring a precise volume of medicine communicated filled into and stored within the dose syringe.

Manufacturing (Pre-Use) Steps (for Multiple Syringe Filling Kits):

a. acquiring a kit bag;

b. making a hole in the bag (where a filter assembly is to be disposed), the hole being sized and shaped to snugly allow displacement of the male fitting of the sterilizing filter to be displaced there through and preferably displacing the male fitting of the filter through the hole from outside the bag;

c. displacing a gasket about the filter male fitting;

d. securely affixing a luer fitting connection to compress the gasket against the associated bag material and disk wall of the filter to assure the singular path through the filter is the only entry for matter into the bag when closed and sealed. Note that disposing the gasket inside the bag is preferable due to protection provided by surrounding bag material;

e. releasibly affixing a luer fitting of the dripless connector to the luer filter fitting, to provide a sealed communicating pathway, thereby to complete filter assembly construction;

f. displacing items, selected for internal bag disposition, into the kit bag, including dose syringes to be filled and, if required, at least one tray which providing housing wherein syringes can be disposed and selected for filling and any associated plate wherein syringe caps are disposed for capping syringes after filling;

g. closing and sealing the kit bag and sterilizing the closed and sealed bag and the contents therein; and h. assembling the sterilized kit bag with other bag items used exterior to the kit bag to be displaced into a shipping container for determining kit application and delivery to user.

Using Steps:

a. opening the shipping container, accessing the convenience kit and "tenting" the kit bag to provide space for digital manipulation of syringe filling procedures;

b. acquiring and filling raw medicine into the exterior source assembly container (preferably a syringe);

c. assuring that a dripless connector, if needed, is affixed between the internal source container and the male luer fitting of the filter assembly for drug containment when the source vessel is disengaged for liquid communication with a next dose syringe to be filled;

e. displacing the desired raw medicine disposed in the exterior source assembly via the communication pathway into the interior source container;

f. performing a "bubble test" to assure filter efficacy and, thereby, sterility to a desired SAL of sterilized medicine dispensed therefrom. If the "bubble test" proves efficacy of the filter, continue with the following steps, otherwise displace the interior container from the kit bag, as unsterilized source, to be used with another convenience kit, dispose the current convenience kit and proceed to step "a" of the Using steps, above; For each dose syringe of a plurality of dose syringes, disposed in a tray, to be filled with sterilized medicine from the interior source container, performing the following steps by:

g. affixing the dripless connector of the interior source container assembly, in turn, to each selected empty individual dose syringe and opening any valve of the associated dripless connector which protects against spillage and contamination;

h. displacing the barrel of the selected syringe relative to the plunger rod of that syringe to overfill the selected dose syringe;

i. noting that the button of the syringe plunger rod is affixed and stopped by a catch in the well of housing the dose syringe, "pumping" the syringe barrel several times up and down, relative to the plunger rod to separate and displace unwanted air into the interior source assembly;

j. with the plunger rod extended, by displacing the syringe barrel, displacing plunger rod button downward into the measurement well (to contact the plunger rod button stop thereby) and barrel finger flanges are also stopped upon a ledge of the well in which the dose syringe resides which assures an accurately measured dose;

k. closing any associated valve and disengaging the interior source syringe and, if more dose syringes are to be filled, returning to step "g";

l. if a plate of caps is provided, displacing the plate as a unit in position to affix each syringe with a sealing cap; and thereafter m. opening the kit bag for access to filled dose syringe which are filled, capped and ready for use in a potentially contaminating environment.

Therefore, it is a principal object to provide a kit bag as a major convenience kit component, the kit bag providing protected space, conditions and components, disposed therein, for communicating, with safety, a measured portion of sterilized medicine into each dose syringe disposed within the kit bag while maintaining a predetermined level of sterility through filling and capping.

It is, therefore, a major object to provide the kit bag, and all components disposed and protected therein, being pre-sterilized, closed and sealed for providing a clean, sterile environment for syringe filling and capping.

It is a further major object to provide access for fluid communication into the kit bag through a single hole which is closed and sealed by a gasket about an inserted portion of a sterilizing filter such that there is no other pathway for matter entry into the kit bag.

It is a still further major object to provide, as needed, an interior source syringe or assembly as an untethered appliance for displacing and communicating sterilized medicine to a plurality of dose syringes.

It is a notable object to provide a convenience kit for filling a plurality of syringes with as few steps as possible to provide a high volume of syringes filled with sterile medicine at a labor cost which is significantly lower than current cost to provide the same product being prepared using currently available technology such as laminar flow hoods.

It is an important object to provide a tray comprising wells wherein a plurality of syringes are disposed for being accessed for being affixed to an interior source syringe for filling and being filled to a predetermined dose of sterilized medicine.

It is another important object to provide finger flange restraints whereby each syringe is immobilized against being spilled from a well and held upright before being capped.

It is an utmost object to provide for separating gas from liquid upon final filling of each syringe such that only liquid sterile medicine is disposed in a filled dose syringe.

It is also an utmost object to provide for accurately measuring and achieving a dose syringe fill volume within desired dosing accuracies.

It is a necessary object to provide for capping each filled dose syringe before being accessed from the kit bag to ensure retained medicine sterility when delivered to a potentially contaminating environment.

It is a highly desirable object to provide a dripless connector to assure against spillage of precious and sometimes hazardous sterile medicine.

These and other objects and features of the present invention will be apparent from the detailed description taken with reference to accompanying drawings.

BRIEF DESCRIPTION OF THE DRAWINGS

FIG. 24 is a cross-section of a dose syringe seen in FIG. 19.

FIG. 48 is a side elevation of a cross section of a dose syringe with a zero dead space sharpened cannula affixed thereto.

FIG. 49 is a depiction of a zero dead space sharpened cannula.

FIG. 50 is a perspective of a sealable medical capsule.

FIG. 51 is a perspective of the sealable medical capsule, seen in FIG. 50, with a pad disposed therein.

FIG. 52 is a perspective of a dose syringe with a small drop of sterile medicine dispensed therefrom for soaking a pad disposed in the medical capsule seen in FIG. 51.

DETAILED DESCRIPTION OF THE ILLUSTRATED EMBODIMENTS

In this description, the term proximal is used to indicate the segment of the device normally closest to the object of the sentence describing its position. The term distal refers to the other end of the segment. Reference is now made to embodiments illustrated in FIGS. 1-55 wherein like numerals are used to designate like parts throughout. Primes of numbers are indicative of part similarities in application and function, but with noted differences from other like numbered parts. Notably, the following methods for making and using convenience kits, made according to the instant invention, are provided with further objects to:

1. Provide methods and convenience kits for processing raw medicine to render a sterilized product.
2. Provide tools and methods for making hazardous drug preparations with safety and efficacy by providing apparatus and methods which protect against spills and unrestrained drips.
3. Reduce steps, including garbing and training necessary to sterilize, fill and cap syringes and, thereby, cost of labor and material involved with producing sterilized medical preparations.
4. Provide the basis for making and using convenience kits for preparing costly drugs used in very small dose volumes yet required in large multiple syringe quantities.

Figure 1:
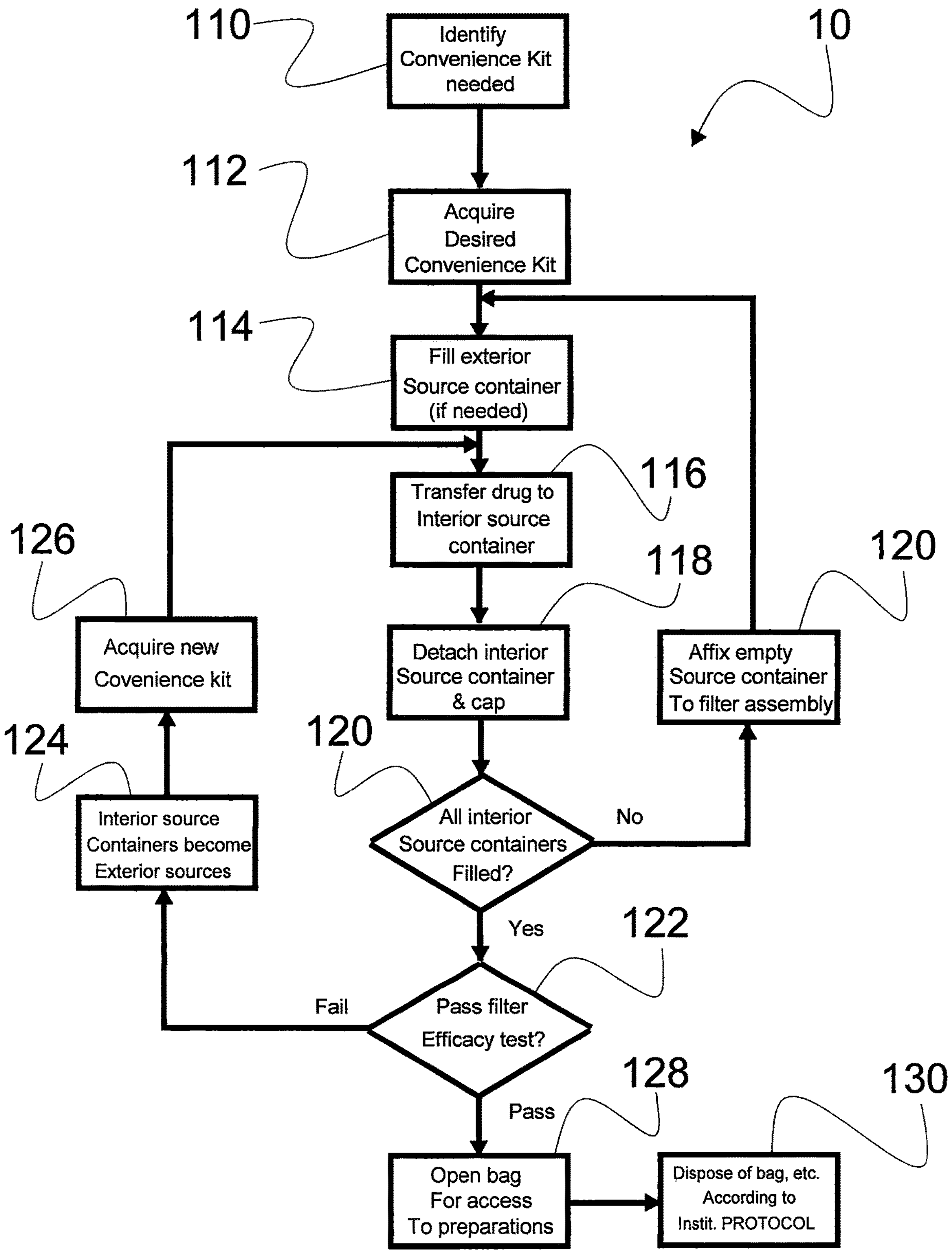
FIG. 1 is a flow chart providing a series of steps associated with a method for acquiring raw hazardous medicine from an exterior source, sterilizing then displacing the sterilized medicine into one or more syringes disposed within a sterile field of a closed plastic bag, each such syringe being fitted with a dripless connector for safety of full drug containment upon being accessed from the plastic bag for use in medical treatment.
Figure 2:
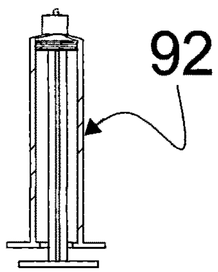
FIG. 2 is a cross section of a medical dose syringe provided for visual identification of syringe parts.
Figure 3:
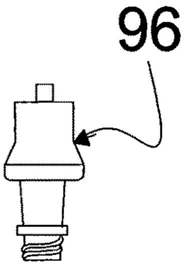
FIG. 3 is a depiction of a needleless connector such as a Clave® connector sold by ICU Medical, Inc.
Figure 4:
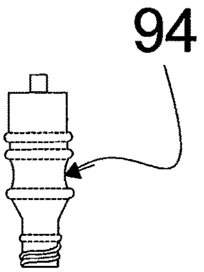
FIG. 4 is a depiction of a dripless connector, commonly used in hazardous drug applications, such as Spiros® connector sold by ICU Medical, Inc.
Figure 5:
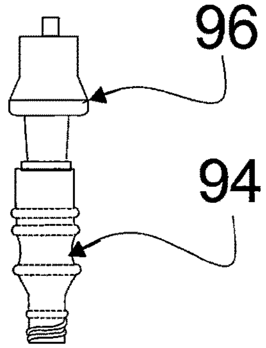
FIG. 5 is a depiction of a combination needleless connector, seen in FIG. 3, and a dripless connector, seen in FIG. 4, joined for use in providing a separable, dripless connection of a line containing a hazardous drug.
Figure 10:
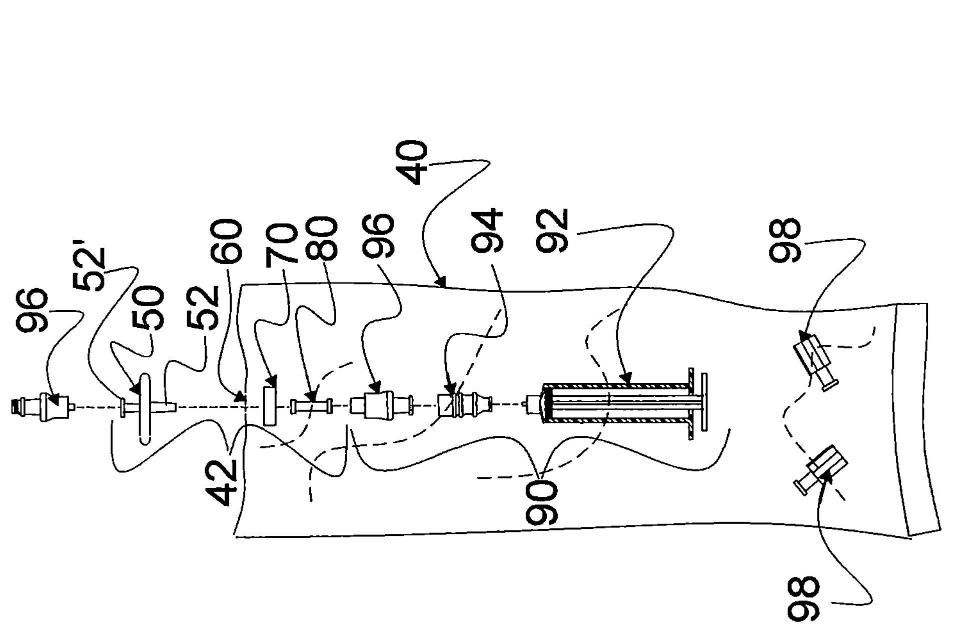
FIG. 10 is a depiction of an exploded view of the formation of a plastic bag portion of a convenience kit being fitted with a filter assembly according to the present invention along with parts which are used for communicating medicine to a syringe and caps for closing connections which are apart in the exploded view and are to be affixed after syringe filling.
Figure 11:
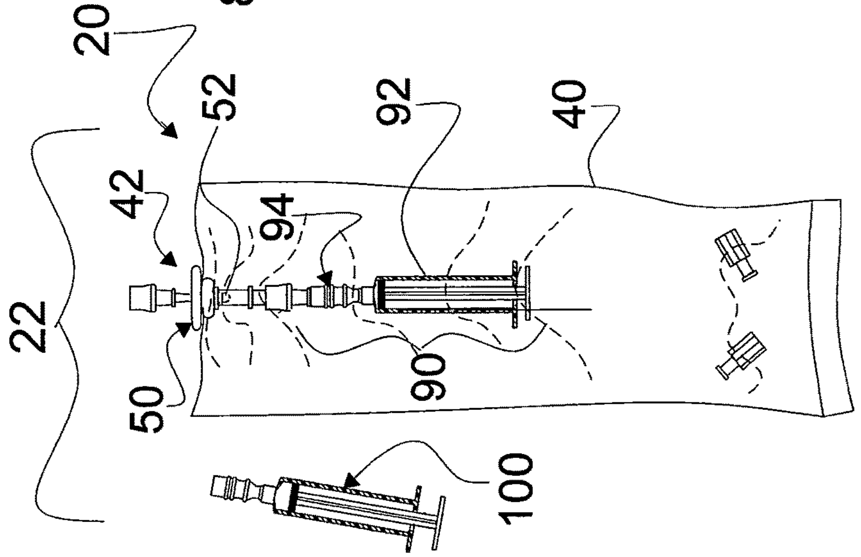
FIG. 11 is a depiction of a fully assembled kit, combining parts seen in FIG. 10, with a filter assembly providing the only entry into the plastic bag.

Two general examples of convenience kits for filling and preparing syringes with hazardous drugs are disclosed herein. The first example is for comparatively large syringes processed in small quantities of one or more. The second example is for small syringes (generally, on the order of 1 mL or less) filled with small doses (e.g. tens of micro-liters or less) of medicine, but prepared in large quantities (on the order of dozens of dose syringes by a single kit). Following is disclosure of the first example:

A process flow chart 10 seen in FIG. 1 discloses exemplary processing steps which are generally associated with convenience kit inventions made according to the instant invention for sterilizing and displacing hazardous drugs into a dispensing dose syringe with safety afforded by using dripless and needleless connectors and a closed processing bag. A specific example (a convenience kit 20), in this case, is seen in FIG. 11. Convenience kit 20 includes a bagged convenience kit 22. Generally, each such convenience kit 22, as seen in FIG. 11, comprises a plastic kit bag 40 in which items are contained for sterilizing and preparing a hazardous drug medicine for use in a medical procedure. Plastic kit bag 40 is most often selected from commercial plastic bags, used in sterile medical applications, which comprise sufficient internal volume for performing tasks associated with in-bag objectives. Kit bag 40 should be made of material which is sufficiently clear to visualize items contained therein, sufficiently pliant to permit digital displacement and, if necessary actuation, of the items, sufficiently rugged to not be breached by such digital action and sealable and sterilizable to provide a sterile environment for the items throughout medicine preparation. As seen in FIG. 11, kit bag 40 is closed and sealed about a portion of a filter assembly 42 comprising a sterilizing grade filter 50 (preferably 0.2 micron) having a male luer fitting 52 (best seen in FIG. 10). As seen in FIG. 10, fitting 52 is disposed to be displaced through a hole 60 in bag 40 to provide the only matter pathway into kit bag 40. Hole 60 is closed and sealed by a gasket 70 which is forcibly held in place by a female/female fitting 80 securely affixed to male luer fitting 52. A female fitting 52' of filter 50 is also affixed to a needleless connector 96 to provide for hazardous drug safety when communicating with an exterior source syringe 92' (see FIG. 12). A syringe assembly 90 comprising a medical syringe 92, a dripless connector 94 and a needleless connector 96 is securely, but releasibly affixed to fitting 80. For clarity and future reference, syringe 92 is also seen in FIG. 2; needleless connector 96 is seen in FIG. 3; and dripless connector 94 is also seen in FIG. 4. Dripless connector 94 is also seen joined to needleless connector 96 for operating as a single dripless connector, as commonly used for hazardous drug communication in FIG. 5. Two combination luer fitting caps commonly numbered 98 are also provided for capping uncovered fittings before access to syringe assembly 90, from bag 40, after filling (see FIG. 10).

Figure 6:
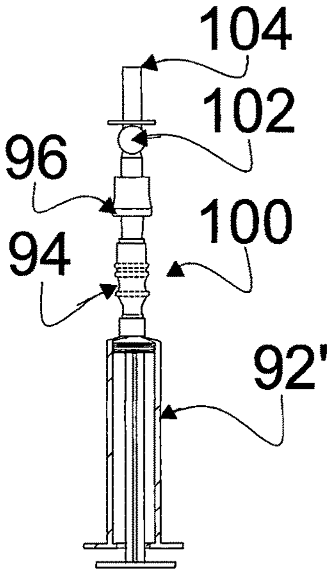
FIG. 6 is a depiction of a syringe, in cross section, affixed to a needless connector/dripless connector combination, as seen in FIG. 5, and further, thereby, affixed to a capped, vented vial adapter to form an exterior source assembly.
Figure 7:
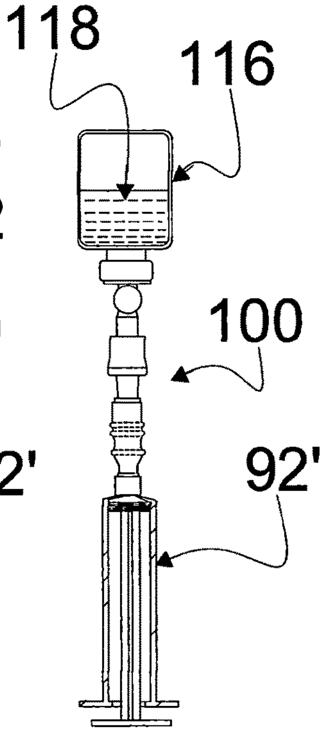
FIG. 7 is a depiction of the syringe and other parts seen in, FIG. 6 wherein the vented vial adapter is uncapped and used to spike a medicine containing vial.
Figure 8:
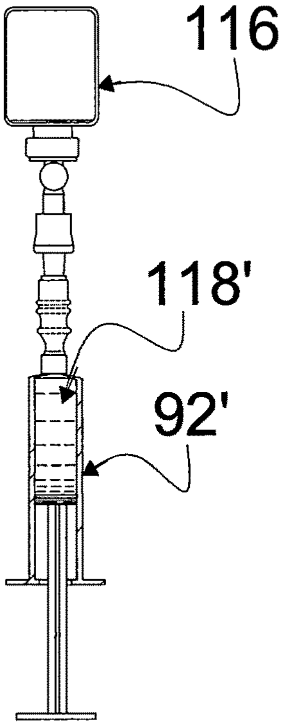
FIG. 8 is a depiction of the syringe and other parts seen in FIG. 7 wherein medicine seen within the vial in FIG. 7 is drawn into the syringe.

As part of a total kit assembly (well understood by one who is skilled in convenience kit art), an exterior syringe assembly 100 (first seen in FIG. 11), for use exterior to kit bag 40, is also seen in FIGS. 6-8. Syringe assembly 100 is used for raw medicine accessing and is a part of a general and complete kit assembly (not shown, but well understood by those who are skilled in convenience kit art). It is common for such items to be packaged together to form complete kit assemblies, as each part fills a selective need, the complete kit assemblies commonly being sold as a single product. As seen in FIG. 6, for providing an exterior source of raw medicine to be sterilized and prepared within kit bag 40, a syringe assembly 100 comprises a medical syringe 92', a dripless connector 94 which is releasibly affixed to a needleless connector 96 which is serially affixed to a vented vial adapter 102 which is closed by a removable cap 104.

Referring once more to FIG. 1, a first step, defined in operational block 110, is selecting a kit which can be used in preparation of a pre-selected hazardous drug requiring sterilization and displacement into a syringe, and, of course, acquiring such a kit as indicated in operational block 112.

Figure 9:
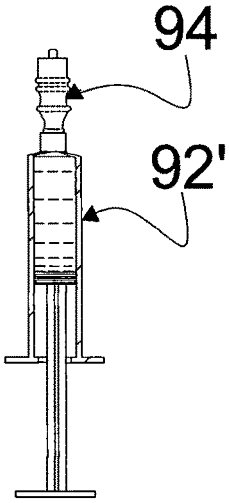
FIG. 9 is a depiction of filled syringe seen in FIG. 8 with detachment of the needleless connector from the dripless connector for use in providing hazardous drug medication to a patient.

Further reference is now made to FIGS. 7-9 where by the steps to accomplish filling an exterior source container as stipulated in operational block 114 are seen. As seen in FIG. 7, vial adapter cap 104 (seen in FIG. 6) is removed before a vial 116 containing the pre-selected hazardous drug 118 is spiked and, thereby, affixed to syringe assembly 100. Raw preselected drug 118, contained in vial 116 is then drawn into syringe 92' as seen in FIG. 8. In FIG. 9, syringe 92', with the dripless connector 94 affixed thereto for safety, is detached for use as an exterior source for supplying raw medicine for sterilizing and further filling a pre-sterilized syringe 92 disposed within protective kit bag 40.

Figure 15:
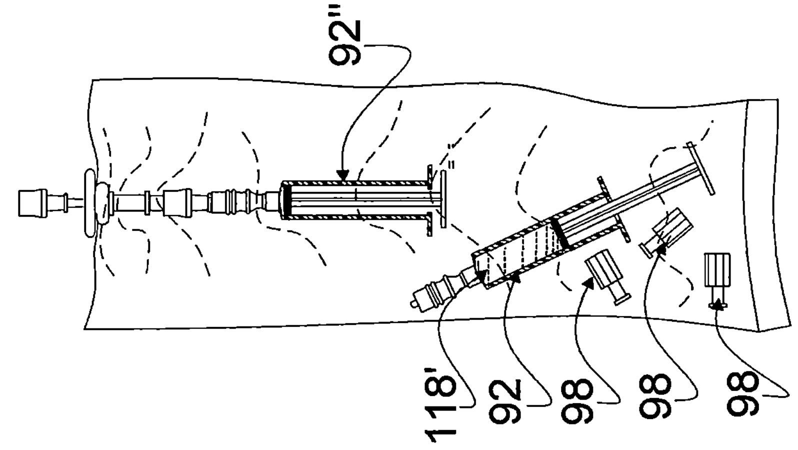
FIG. 15 is a depiction of a syringe not seen in prior FIGs., but seen herein affixed to exemplify communication with a filter assembly to provide for using a convenience kit for filling more than one internally disposed syringe in a bag.
Figure 14:
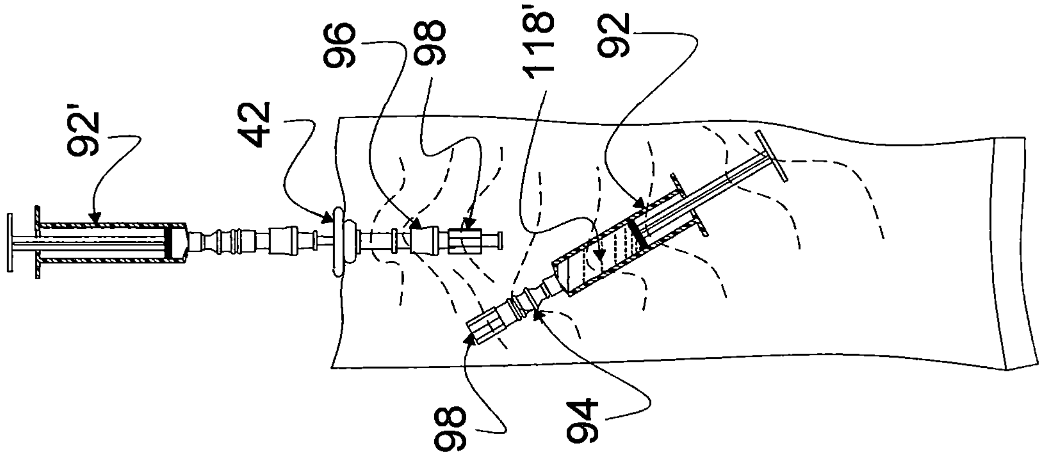
FIG. 14 is a depiction of the syringe seen filled in FIG. 13 detached from the filter assembly but still affixed to the needleless connector which is capped and with a cap being affixed to the dripless connector, as well.
Figure 13:
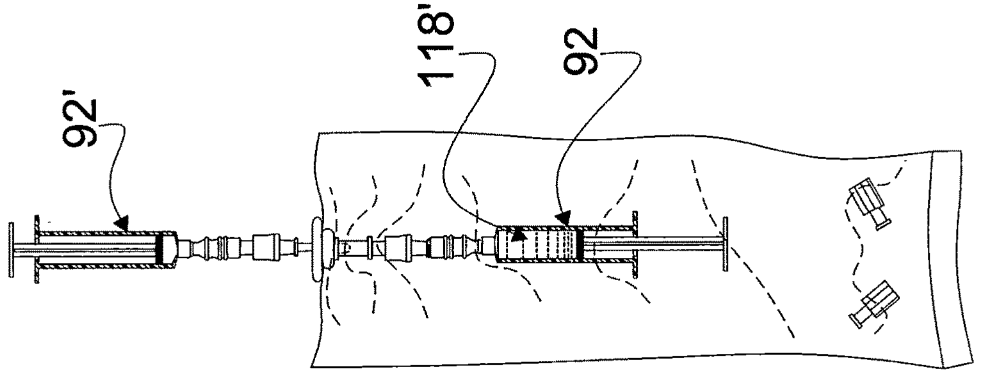
FIG. 13 is a depiction wherein raw medicine has been communicated into the syringe first seen disposed in the bag in FIG. 10.
Figure 12:
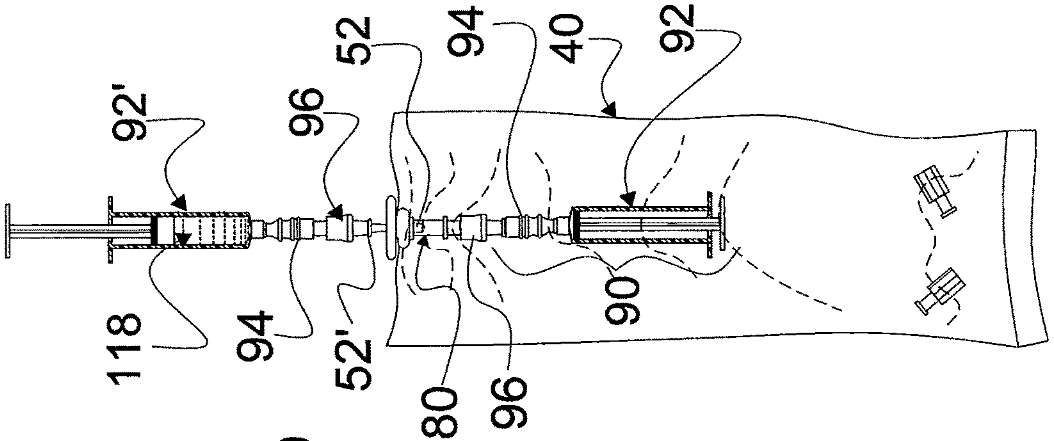
FIG. 12 is a depiction wherein an exterior raw medicine source, disposed within a syringe affixed to the filter assembly seen in FIG. 11, is provided for communicating raw medicine to the receiving syringe.

The next step, as defined in operational box 116, is communicating sterilized drug 118' into an internal source syringe 92 as seen in FIGS. 12 and 13. Detaching syringe 92, filled with so processed sterilized drug 118', is completed by separating a dripless connector 94 from a needleless connector 96 and capping both freed orifices with a cap 98, as seen in FIG. 15. Note that a second syringe 92" could be resident in kit bag 40 for receiving processed medicine 118' in the same fashion, as well. Note also a third cap 98 can be made available for such purposes. Decision block 120 is next executed to determine status of completing syringe 92 (and 92", if needed) filling. If no more syringes 92 are yet to be filled, the next step is determined by operational box 122.

Once all syringes 92 (and optionally 92") are processed and filled, sterilization status of medicine must be assured. As is common practice with sterilizing filters, a “bubble” test, which determines filter 50 efficacy should be performed. If the “bubble” test fails, decision block 122 directs action to block 124. In such a case, all syringes 92 filled with non-sterilized medicine can be used for exterior sources of raw medicine (not yet sterilized). To then complete action on the non-sterilized medicine, following acquisition of a new kit (block 126), the process, beginning at block 116 is then repeated.

However, if the filter efficacy test is affirmatively passed, each capped and filled syringe 92 (and alternatively 92"), with sterilized medicine contained therein, with sterilization assured, can be accessed by breaching bag 40 (action block 128). Unused parts should then be disposed according to institutional protocol (see action block 130).

Disclosure of the second example follows. Referring to flow chart 198, seen in FIG. 16, action block 200 specifies determining a specific kit to be used. Making a preparation of vitreous substitute medicine is an exemplary basis for the first kit to be disclosed hereafter. (A similar method may be used for supplying mitomycin filled syringes.) However, for vitreous substitutes, a convenience kit 202, first seen in FIG. 17, made for vitreous substitute preparation is acquired as specified in block 204. In this example, convenience kit 202 includes a sterilizing, filling and capping subkit 205 and an exterior source assembly 100.

In this example, sterilized portion 205 of convenience kit 203, wrapped and bound for transport by a binding ribbon 207 about an associated kit bag 210, provides a multiple number of dose syringes, each commonly numbered 220 disposed in a tray 230, along with a plurality of capping plates (each commonly numbered 240) all disposed within enclosing kit bag 210. Note that syringes 220 are each disposed in a well of tray 230, each such well being commonly numbered 250. A filter assembly 42 is disposed with a portion 241 inside bag 210 and a portion 241' outside bag 210, as disclosed supra. Affixed to filter assembly 42, inside bag 210, is an interior source assembly 280 (See FIG. 17A).

Action associated with action block 206 is substantially the same as that disclosed for action block 114 of FIG. 1. Raw vitreous substitute medicine is commonly provided in a vial similar to vial 116, disclosed in FIGS. 7-8. An exterior source assembly 100 (seen in FIG. 6) is provided as part of convenience kit 202. Exterior source assembly 100 syringe 92' can be filled as disclosed in FIGS. 7-9.

As instructed in action block 260 (FIG. 16), package stabilizing ribbon 207 should be removed and kit bag 210 may be anchored as specifically instructed hereafter. Further according to action block 272, to provide space for dispensing sterilized medicine into dose syringes 220 as seen in FIG. 17A, kit bag 210 should be tented, as seen in FIG. 17A. Note a workbench 273 which is fitted with a bar 274 designed may be variably disposed to anchor tray 230 to bench 273 and thereby stabilize tray 230 for performing syringe filling activity as disclosed in detail hereafter. Note also disposition of an interior source assembly 280, being superiorly affixed to tented kit bag 210 in FIG. 17A via a filter assembly 42'. Interior source assembly 280 is best seen in FIGS. 28-30 and is used for receiving sterilized medicine via an associated filter assembly 42' (see FIGS. 25 and 26-30).

Figures 25, 26, 27, 28, 29, 30:
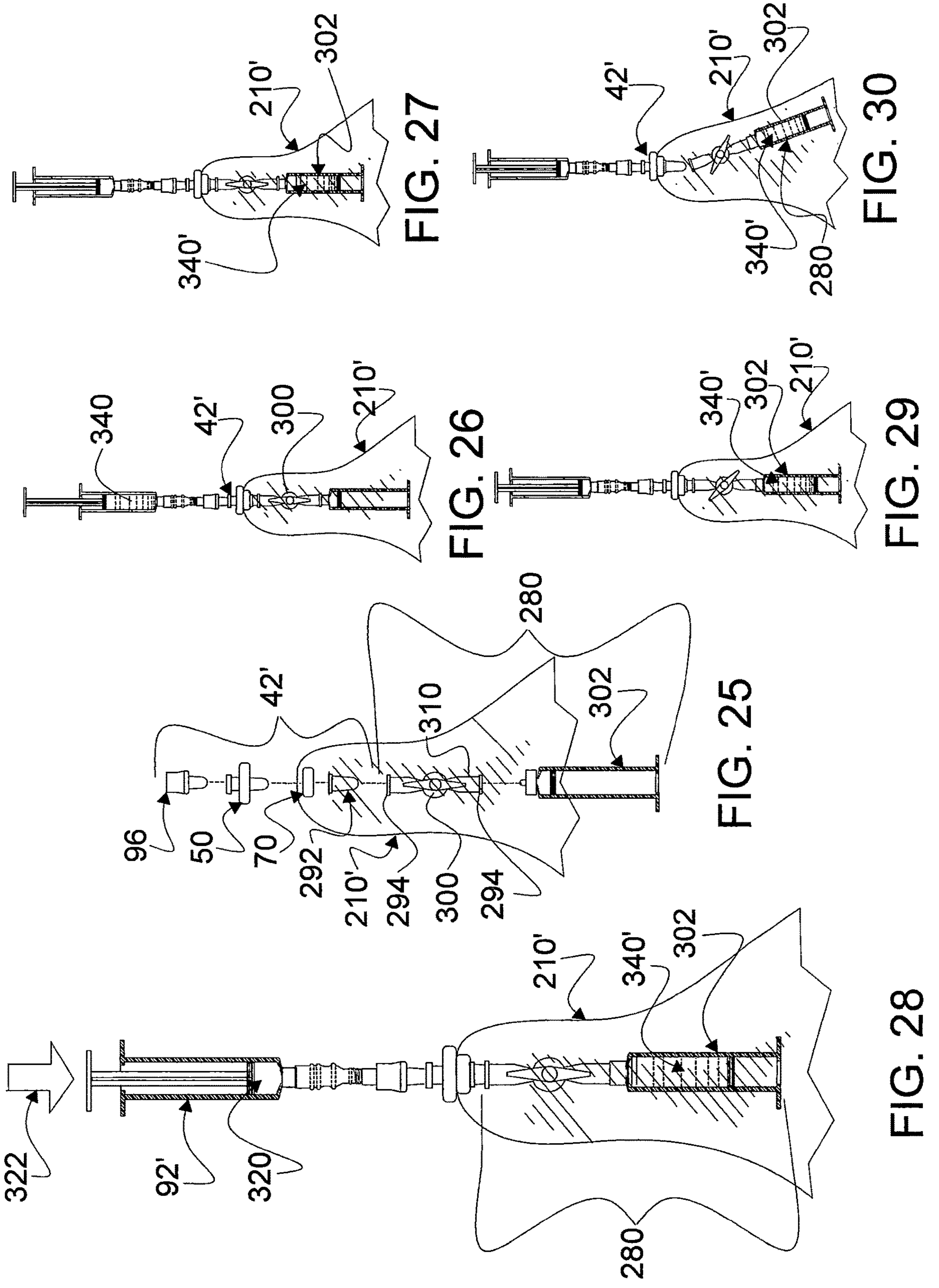
FIG. 25 is a depiction of a portion of a convenience kit made according to the present invention comprising an exploded view of a filter assembly which is seen in FIG. 17 and an exploded view of an interior source container assembly.
FIG. 26 is a depiction of a portion of a convenience kit like the portion seen in FIG. 25, but with exploded parts interconnected and an exterior source assembly affixed to the filter assembly and pre-filled with raw medicine.
FIG. 27 is a depiction of a portion of a convenience kit like the portion seen in FIG. 26, but with raw medicine formerly resident in the exterior source assembly communicated into the interior source assembly.
FIG. 28 is a magnified depiction of the portion of the convenience kit seen in FIG. 27 with an arrow providing direction of force required for a bubble test.
FIG. 29 is a depiction of a portion of a convenience kit like that seen FIG. 27, but with the stopcock closed.
FIG. 30 is a depiction of a portion of a convenience kit like that seen in FIG. 29, but with the interior source assembly detached from the filter assembly.

Reference is now made to FIGS. 25-30 for disclosure of a method for sterilizing raw medicine and displacing the sterilized medicine into an interior source assembly 280 for further dispensing into each dose syringe 220 (see FIG. 17A) as instructed in action block 290. As best seen in FIG. 25, a filter assembly 42' comprises a dripless connector 96, a sterilizing grade filter 50 and a gasket 70, but, different from filter assembly 42, a male/female connector 292 provides a male fitting interface for a female fitting 294 for connector 292. Note that female fitting 294 is one of two female fittings 294 of a stopcock 300, provided for performing as a dripless connector, as disclosed hereafter. As seen in FIG. 25, one of the female fittings 294 is to be affixed to a medical syringe 302 which thereby provides an interior source assembly 280 which is used to supply sterilized medicine 340' to syringes 220, as disclosed in detail hereafter.

It should be carefully noted that vitreous substitute medicines are both expensive and precious. Generally, doses associated with vitreous treatment are measured in units of micro-liters (e.g. approximately six to eight micro-liters/dose). Loss of one drop can lead to a lost dose. For this reason, the interface between each syringe and a providing female fitting must be dripless. It is for this reason that a stopcock is presented herein as an exemplary component of an interior source assembly. When completing each liquid interchange with a syringe, a disconnection of the associated interior source assembly, in this case numbered 280, must be dripless. Such is accomplished by switching the stopcock 300 to an off state before each such disconnection. As seen in FIG. 26, stopcock 300 has been switched to an open state after being affixed to filter assembly 42', and switched to a closed state upon filling completion (see FIG. 29). The transfer of medicine 340 seen accomplished in FIGS. 26 and 27 which prepares interior source assembly 280 for dispensing sterilized medicine 340' to each syringe 220 once filled and detached from filter assembly 42', as seen in FIG. 30. Note that interior source assembly 280 is free and untethered for facile handling inside kit bag 210, best seen in FIGS. 31 and 32.

Referring to FIG. 28, once interior source container 302 is filled, efficacy of filter 70 must be tested to assure medicine 340 is at a desired SAL in the interior source container 302 (action block 350). An associated bubble test may be performed by one of two methods. For both methods, a quantity of gas 320 (i.e. air) is provided within syringe 92', as seen in FIG. 28. The quantity of air 320 must be sufficient to provide an air interface at filter 70. Then by providing plunger rod displacing a force in direction of arrow 322, a bubble test is performed. If the gas is released (bubbles) into syringe 302, the filter is not effective. Also, if extended force in direction of arrow 322 is not retarded by blockage of air in the filter 70, which should not pass gas once wet, filter 70 has failed the bubble test.

If such occurs, medicine 340' must be considered nonsterile and must not be used. However, as indicated in action block 360 of FIG. 16, even though medicine 340' must be considered unsterile, original contents may be processed once more by using the current interior source container 302 as an exterior source assembly 100 (action block 352) and acquiring a new convenience kit 202 (action block 360) and proceeding to action block 260 of flow chart 198. It should be noted that the above stated action saves otherwise disposable medicine for recovered use before it is distributed in very small doses into dose syringes 220 from which recovery would be both difficult and expensive.

If the bubble test is passed, action block 370 instructs closure of a stopcock 300 to permit detaching interior source assembly 280 from filter assembly without spillage.

Reference is now made to FIG. 24 for identifying characteristics of each dose syringe 220. Each dose syringe 220 is formed by two displaceable parts, a barrel assembly 380 and a plunge rod assembly 382. Barrel assembly 380 comprises a spout 384 where barrel diameter is narrowed to a form of a male luer fitting for fluid communicating, a barrel 386 of generally constant diameter and two finger flanges, commonly numbered 388. Plunger rod assembly 382 comprises a piston 390 formed and designed to provide for emptying barrel 386 with zero dead space, a plunger rod 392 and a plunger rod button 394.

Action block 400 provides initial instruction for a dose syringe 220 filling cycle, which follows filling and detaching interior source assembly 280 from filter assembly 42', as seen in FIG. 30.

Disclosure of form and function of tray 230 is variously seen in FIGS. 18, 19, 20, 21, 22, 23, 23A and 23B. Seen in FIG. 18, tray 230 is an example of a tray which is designed to hold six rows of six each dose syringes 220 (thirty-six total) for filling and capping. It should be noted that such a tray can be designed and built to hold various numbers of syringes of different sizes and shapes, dependent upon size and shape of kit bag 210. Tray 230, therefore, is supported by a base 410 which contains thirty-six dose syringe 220 supporting wells, each well being identified by the number 250. In addition, tray 230 has affixed a total of twelve support posts, each post numbered 420 (i.e two posts per well 250 row) which are used for a capping plate support (disclosed in detail hereafter).

Figure 22:
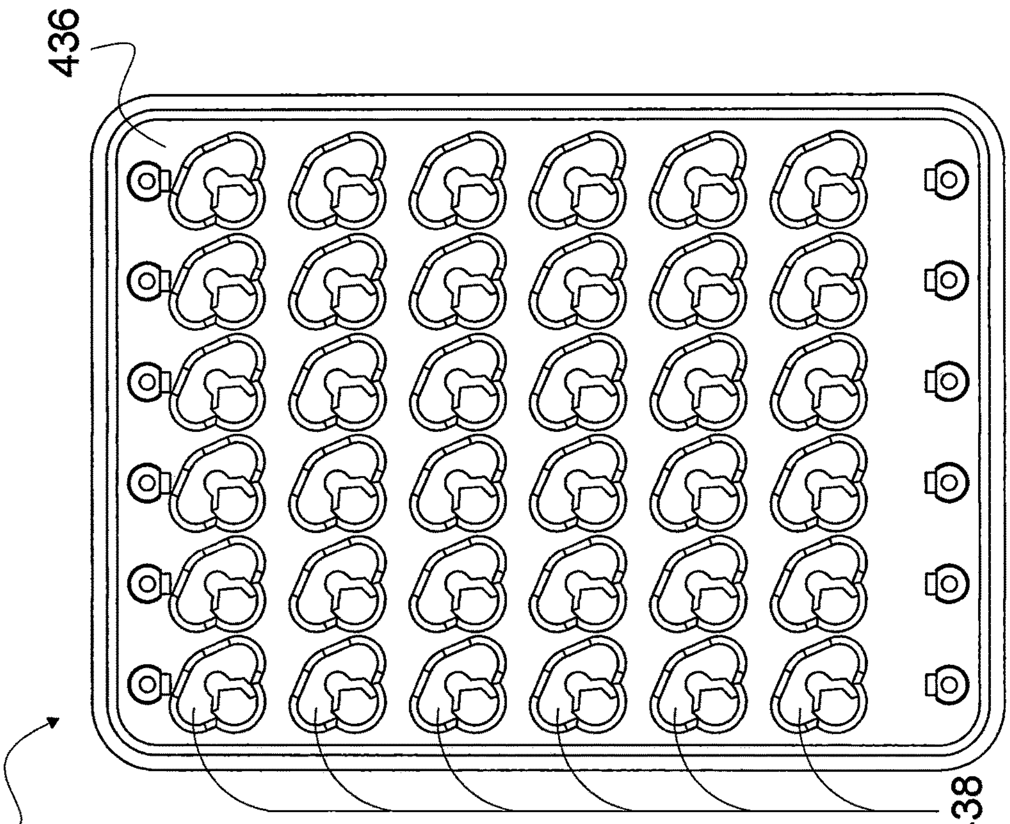
FIG. 22 is a bottom elevation of the tray seen in FIG. 21.
Figure 21:
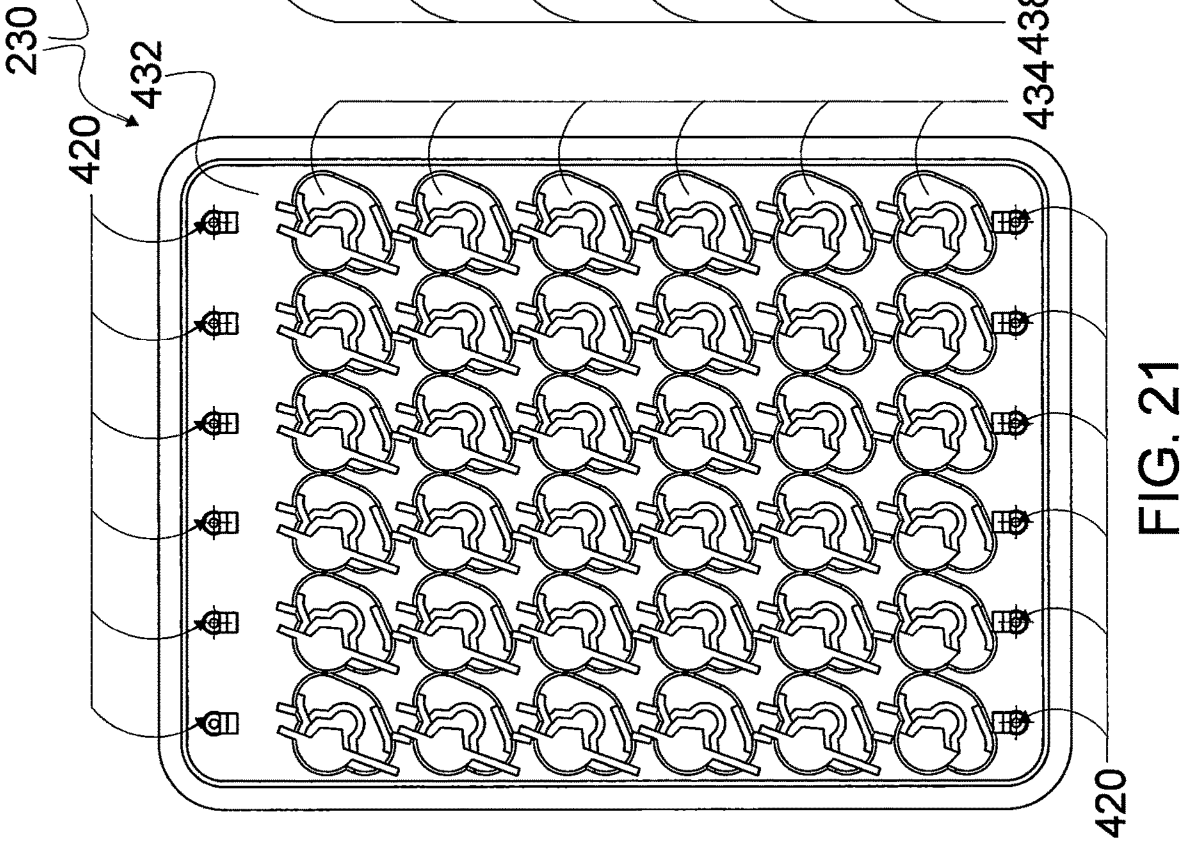
FIG. 21 is a top elevation of the tray seen in FIGS. 18-20 in which multiply wells for holding syringes are depicted.

For reference, a top planar view 432 of tray 230 is seen in FIG. 21, a bottom planar view 432 of tray 230 is seen in FIG. 22. In FIG. 21, thirty-six identical well patterns are seen, each well pattern being assigned a common number 434, for simplicity. Similarly, in planar view 436 in FIG. 22, thirty-six identical well patterns are seen on the opposite side of tray 230, each well pattern being assigned a common number 438, for simplicity.

Figure 23B:
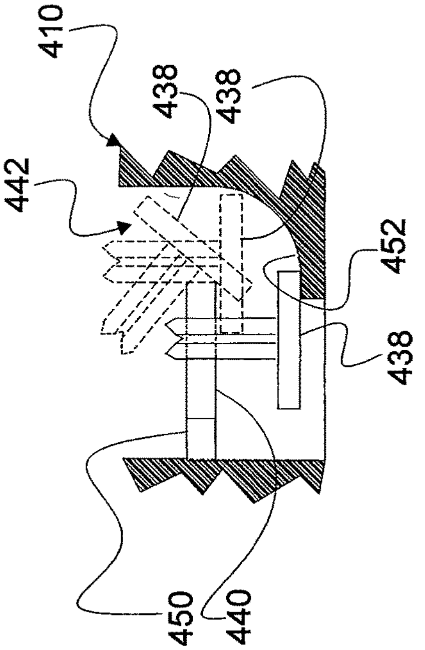
FIG. 23B is a cross section of a well in the tray showing, by dashed lines, plunger rod entry into a well and for being releasibly displaced thereafter.
Figure 23A:
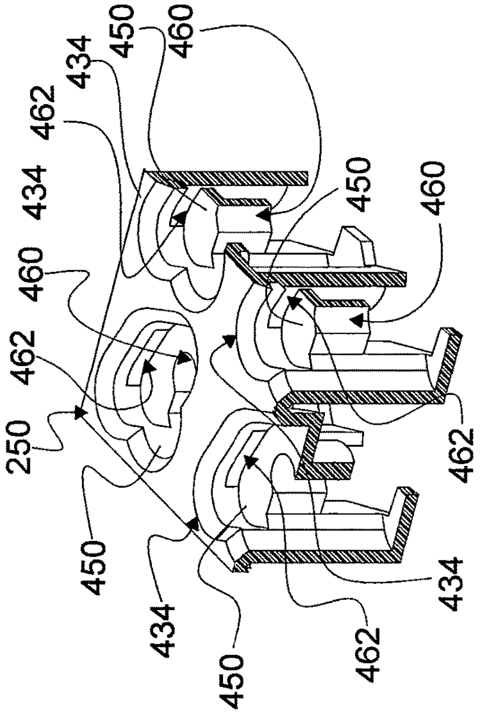
FIG. 23A is a four-well three dimensional section of the tray seen in FIG. 18, with portions seen in cross section.
Figure 23:
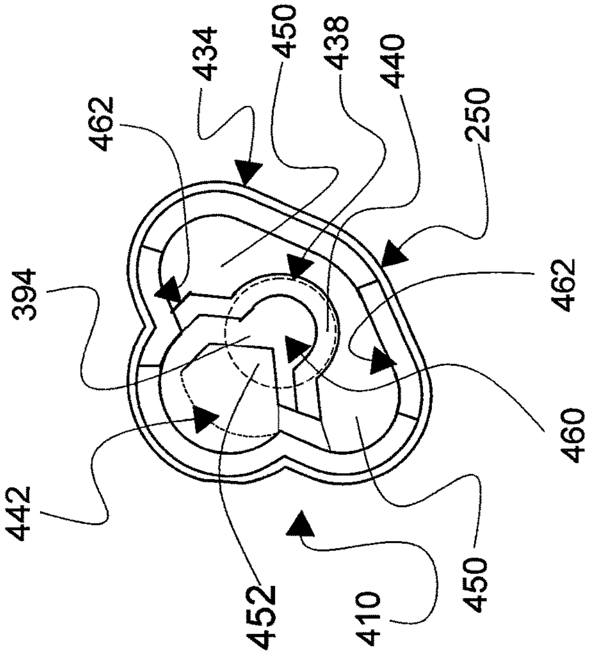
FIG. 23 is a planar depiction of mold structure of a single well seen in FIG. 21.

A single well pattern 434, seen in FIG. 23, and a cross section of four wells in FIG. 23A provide details of form and function of each well pattern 434 associated with each well 250. It should be understood, by those who are skilled in molding art, well 250 molding can be performed by a single pull technique. Solid lines in FIG. 23 portray edges of molding patterns. Dashed line 438 indicates an outline of plunger rod button 394 (see FIG. 24) disposed below and caught and held against upward displacement by a catch 440. An open pathway 442 is permissive to plunger rod button 394 being displaced in and out of well 250 when plunger 392 is not vertical and not otherwise caught against catch 440 as seen in FIG. 23B.

A shelf 450 within each well 250 provides support and a displacement of measure for finger flanges 388 (see FIG. 24). A stop 452 disposed at the bottom of well 250 provides a second displacement of measure. As lengths of barrel 386 and plunger 392 have been found sufficiently accurate and precise for use in determining dose volumes for medical use in syringes used for vitreous substitutes and miomyticin, intra well 250 distances between stop 438 (where a plunger button resides at the end of filling cycle) and shelf 450, where finger flanges so reside, can be established and made by accurate molding to measure plunger rod displacement relative to finger flange disposition, which thereby determines a desired measured dose of sterilized medicine 340. It is that displacement between shelf 450 and stop 438 that provides the critical design criteria for well 250.

Other features of well 250 which may be noted are plunger rod pathway 460 and two slots (commonly numbered 462) wherein, by barrel 380 rotation, finger flanges 388 are inserted for stabilizing and vertically orienting each dose syringe 220.

Figure 19:
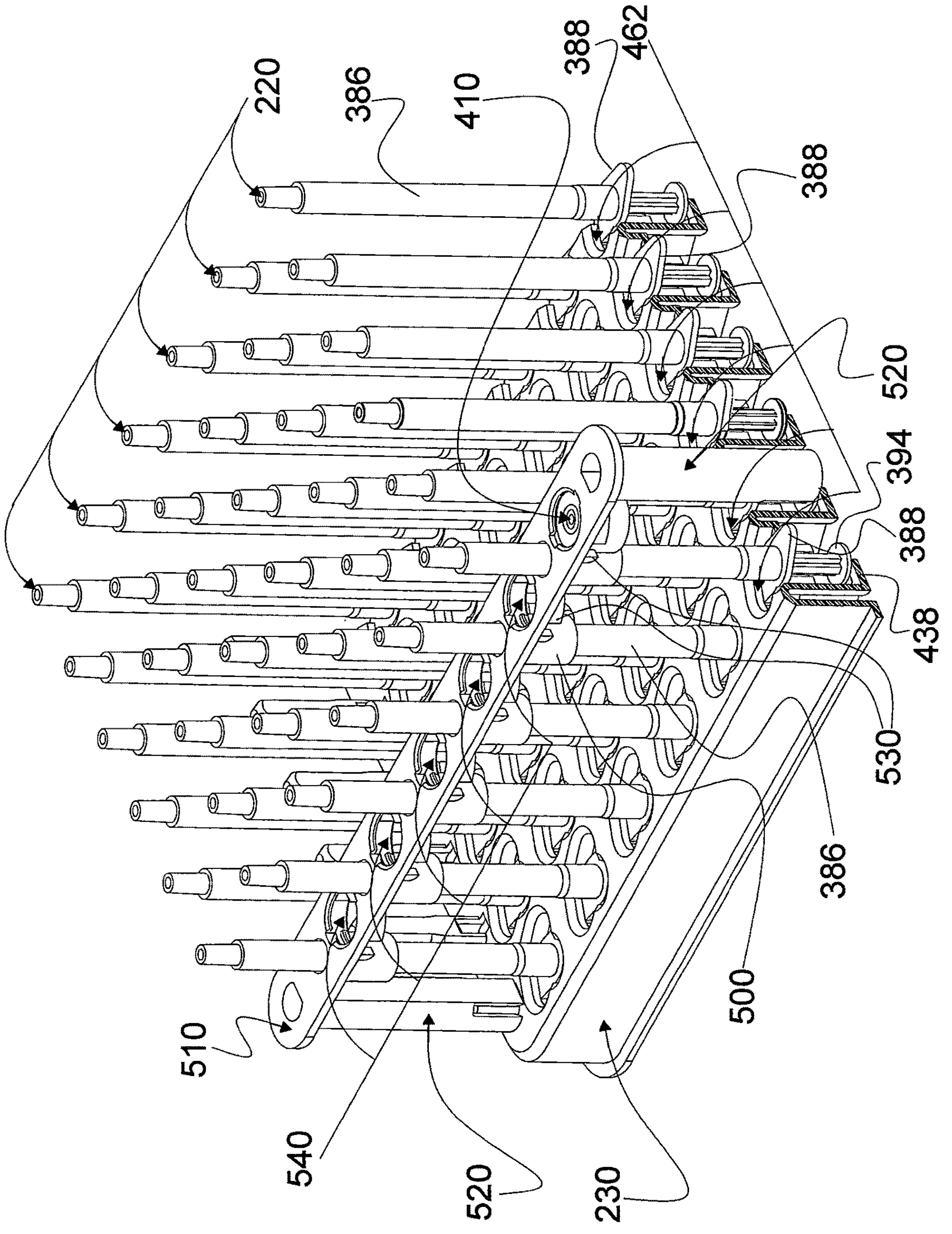
FIG. 19 is a perspective of the tray seen in FIG. 18 with thirty-six medical dose syringes disposed upright with spout up being disposed within wells molded within the tray which is seen with a proximal end in cross section and with one row of dose syringes supported by a cap plate.
Figure 20:
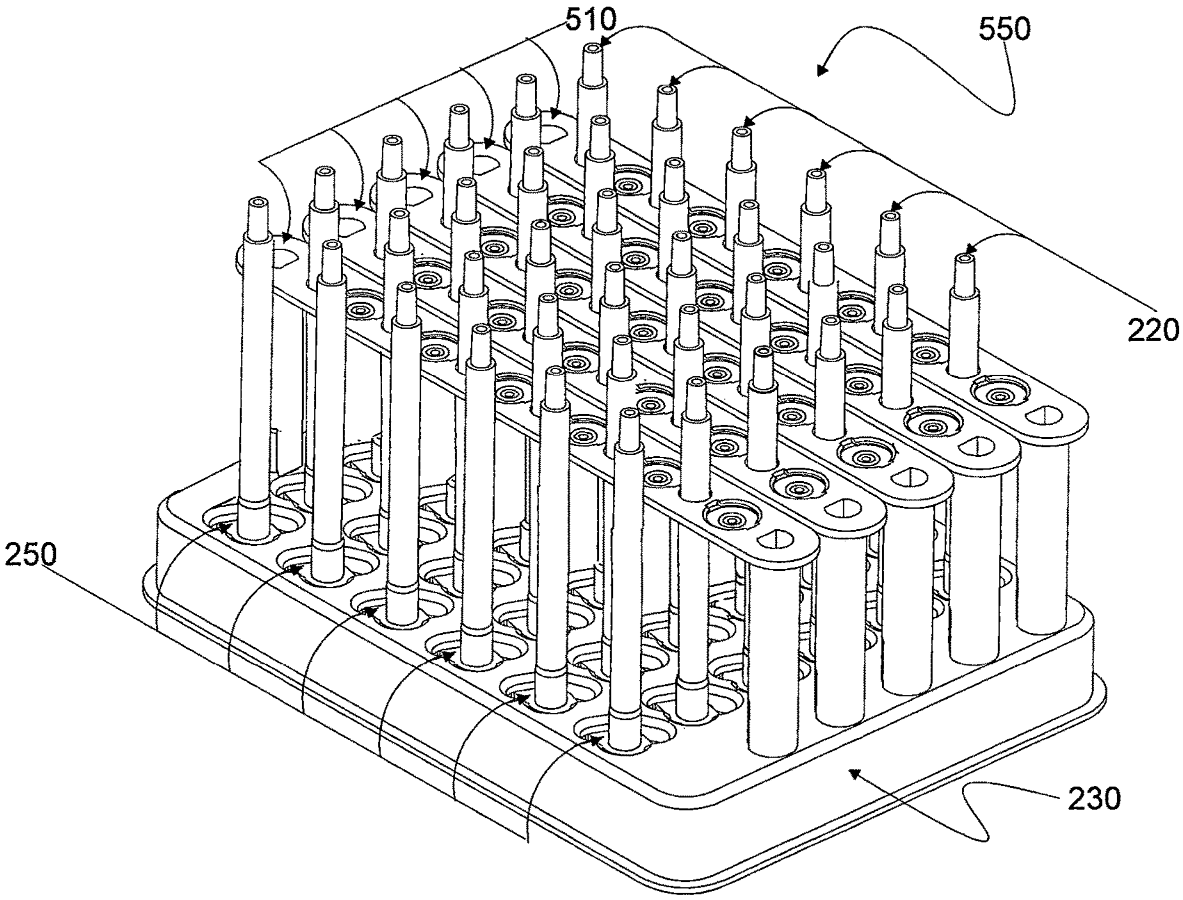
FIG. 20 is a perspective of the tray and dose syringes seen in FIG. 19 further aligned by capping plate guides loosely affixed to dose syringes.

Reference is now made to FIG. 19 where a complement of thirty-six dose syringes 220 are disposed in a like number of wells 250 in tray 230 (see FIG. 20). Note that a barrel 386 of each syringe 220 has been rotated such that finger flanges 388 of each syringe 220 are disposed in associated slots 462. In this example, each plunger button 394 is displaced to be upon a stop 438. Disposed about each syringe barrel 386 is a guide 500 formed as a part of a capping plate 510. Capping plate 510 further comprises a pair of stand-offs, each numbered 520 and being affixed about a post 420 (see FIG. 18) to assure alignment of guides 500 and syringe barrels 386. Generally disposed between guides 500 and standoffs 520 are cap grips, parts of which are commonly numbered 530, being sized, shaped and position to hold a syringe cap 540 until grip parts 530 are displaced one from the other (as disclosed in detail hereafter). As seen in FIG. 20, a full complement 550 of syringes 220 cap plates 510 are releasibly disposed upon tray 230 and ready for displacement into a kit bag 210.

Figure 16:
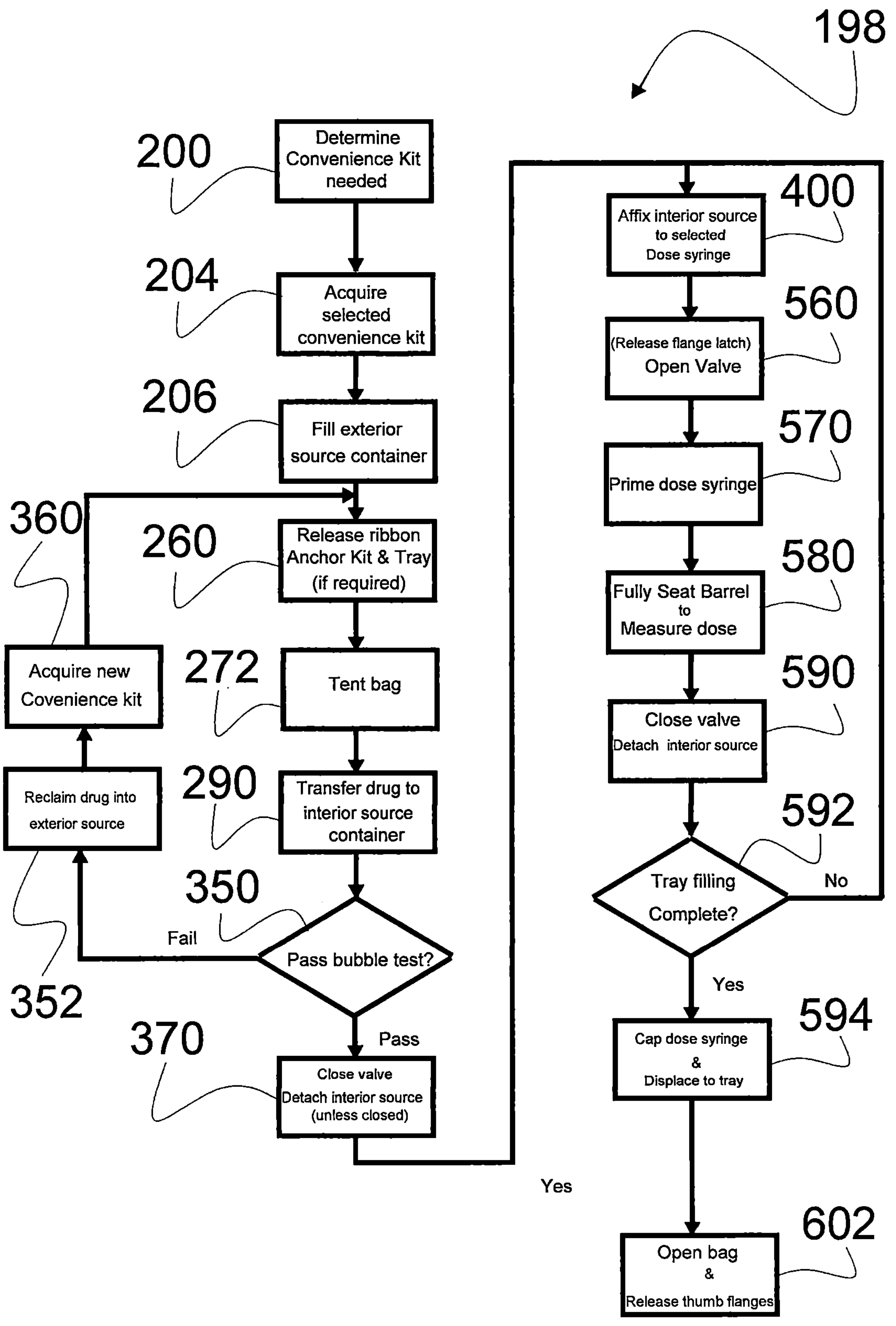
FIG. 16 is a flow chart providing a series of steps associated with a method for acquiring raw hazardous medicine from an exterior source, sterilizing then displacing the sterilized medicine into a plurality of dose syringes disposed in a tray which is further disposed within a sterile field of a closed plastic bag.
Figure 17:
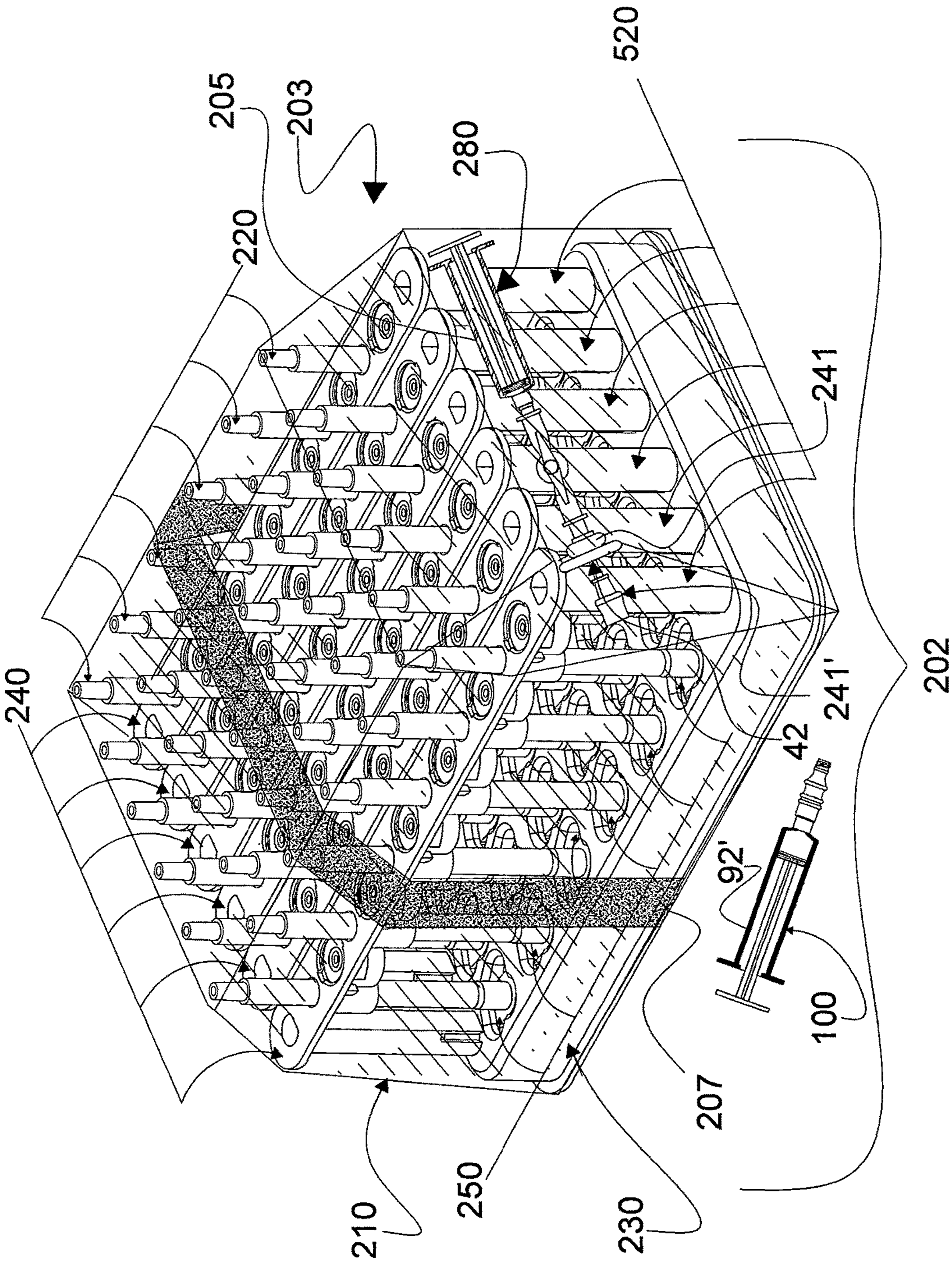
FIG. 17 is a perspective of a sterilized convenience kit provided packaged in a transport state, the convenience kit parts being particularly assembled within a plastic bag, the plastic bag being tightly drawn and folded for holding the parts including multiple dose syringes disposed within a tray within the plastic bag with a sterilizing filter assembly affixed to the bag with a portion seen disposed outside the plastic bag and another portion within the plastic bag to provide the only matter pathway into the plastic bag for sterility retention.
Figure 17A:
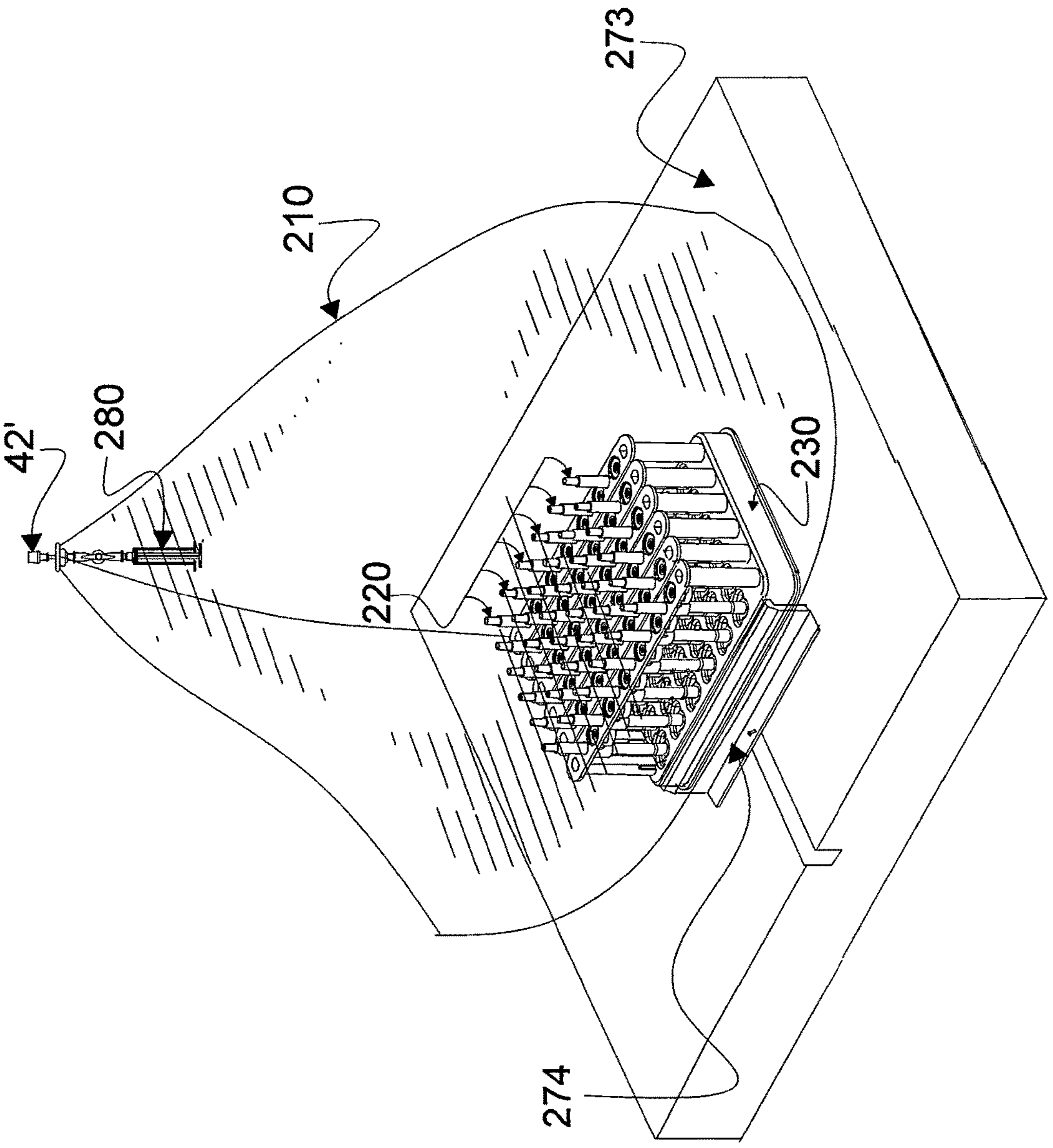
FIG. 17A is a perspective of a the convenience kit seen in FIG. 17 unpacked and tented for use with a filter assembly affixed to an internal source assembly disposed above the tray of syringes, the whole kit being disposed upon a platform whereby the tray is anchored for ease of syringe displacement.
Figure 18:
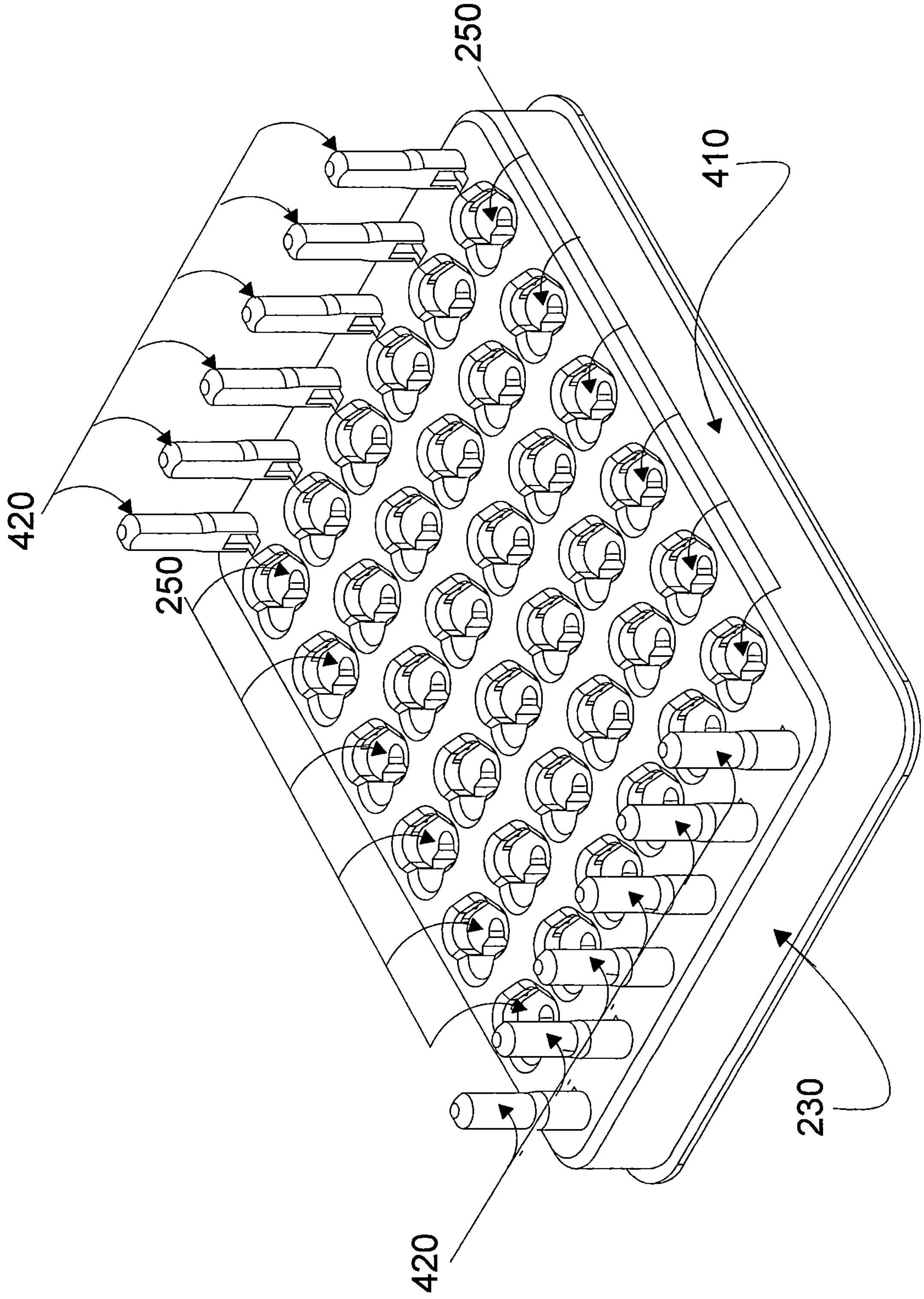
FIG. 18 is a perspective of the tray seen in FIG. 17 empty of syringes and disposed outside the plastic bag.
Figure 32:
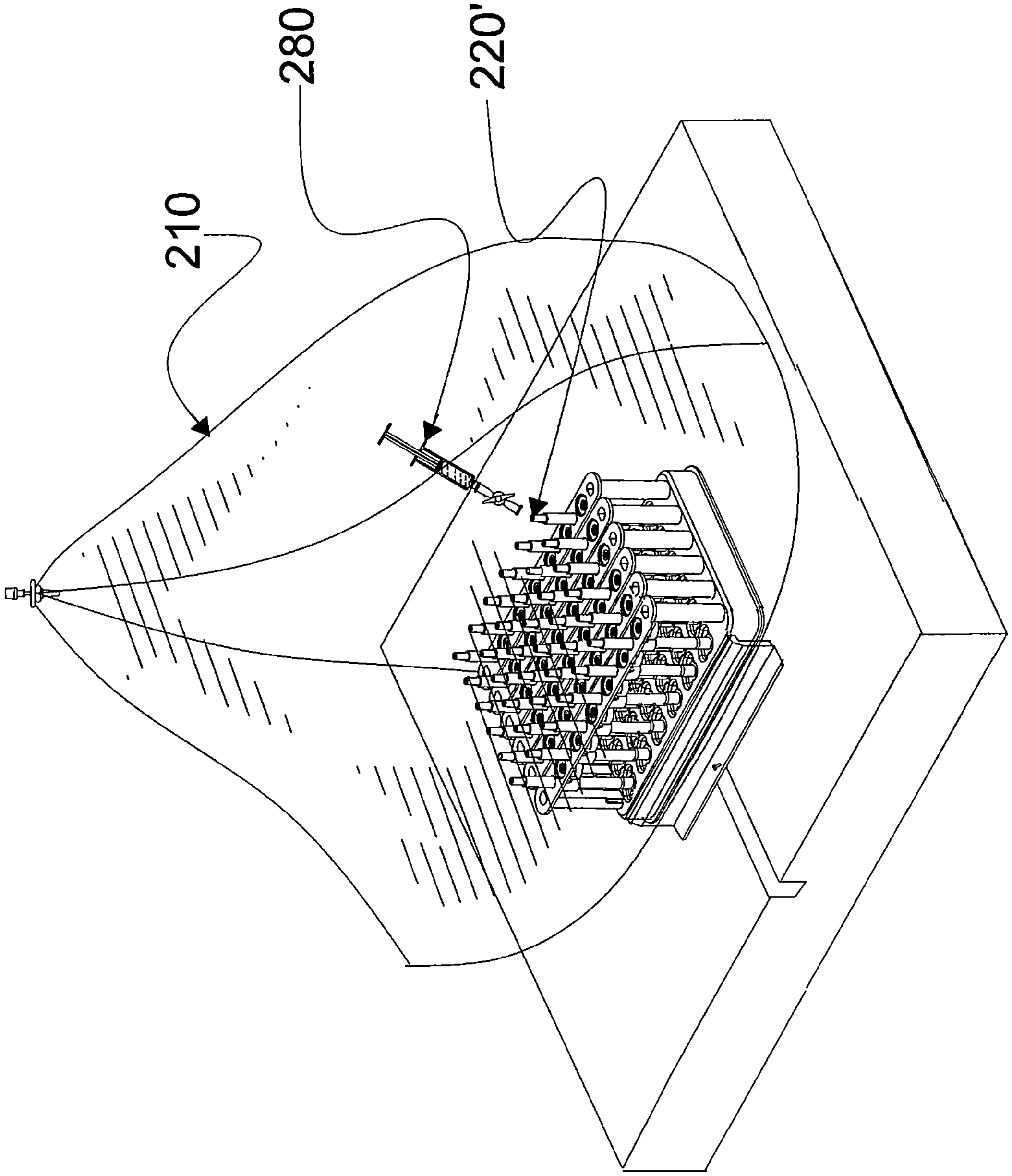
FIG. 32 is a perspective of a convenience kit unpacked and tented with the interior source assembly seen to be untethered.
Figure 31:
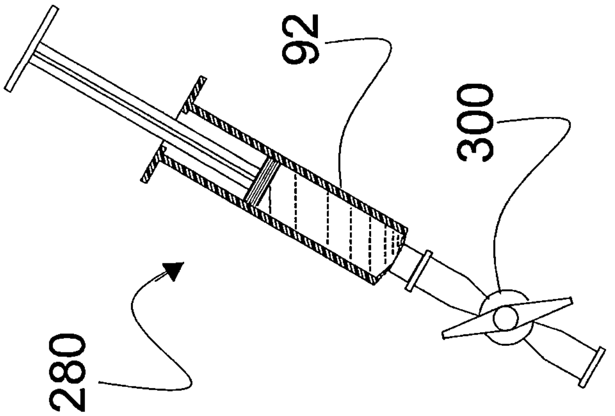
FIG. 31 is a depiction of the interior source assembly with the stopcock in a closed state as seen in FIG. 30.
Figure 33:
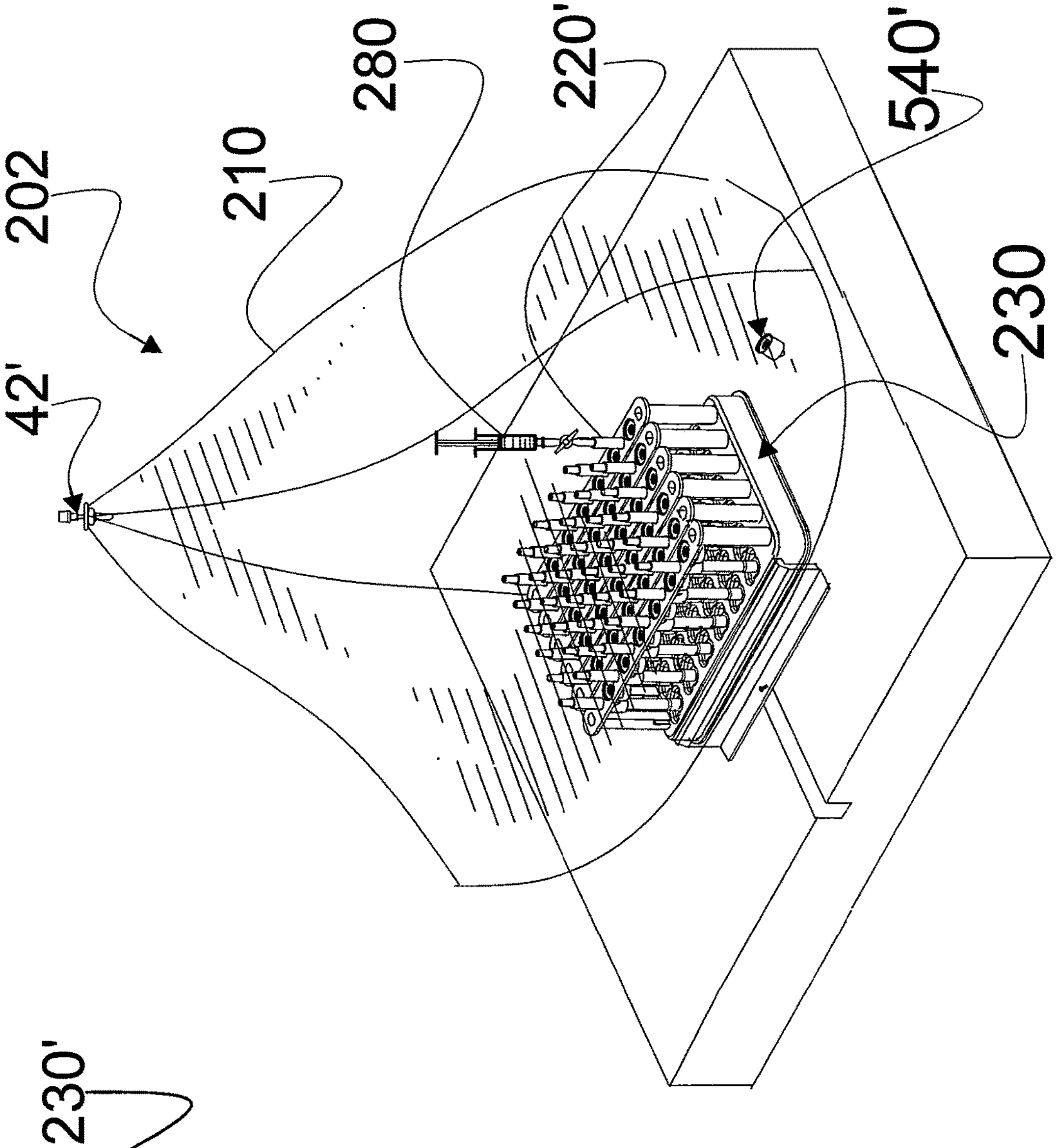
FIG. 33 is a perspective of the convenience kit seen in FIG. 32 with the interior source assembly affixed for liquid communication with a selected dose syringe.

Referring again to Block 400 in FIG. 16, syringe 220 filling begins with displacement of a filled internal source syringe 92, closed by a stopcock 300, as seen in FIG. 31, being displaced as an untethered internal source assembly 280, as seen in FIG. 32. As instructed by block 400 (in FIG. 16), a syringe 220' is selected for filling (see FIG. 32) and internal source assembly 280 is affixed thereto as seen in FIG. 33.

Figures 34, 35, 36, 37, 38, 39:
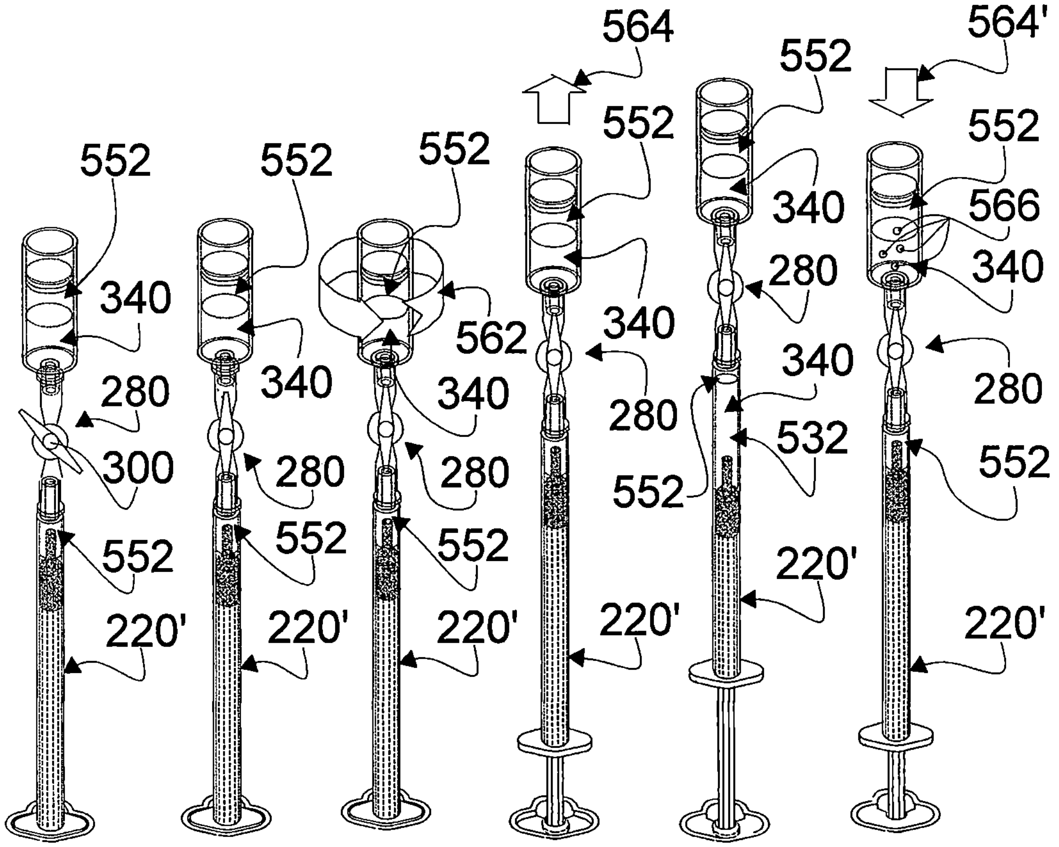
FIG. 34 is a depiction of the interior source container securely affixed to an upright dose syringe, with the stopcock closed, as seen within the kit bag, as seen in FIG. 33.
FIG. 35 is a depiction like the depiction, but seen in FIG. 34 with the stopcock open.
FIG. 36 is a depiction like the depiction seen in FIG. 35 but with an arrow disclosing direction of dose syringe barrel rotation to free finger flanges and thereby freeing the dose syringe barrel to be displaced vertically.
FIG. 37 is a depiction like the depiction seen in FIG. 36 but with an arrow showing direction of vertical dose syringe barrel displacement.
FIG. 38 is a depiction like the depiction seen in FIG. 37 with the dose syringe barrel displaced vertically upward.
FIG. 39 is a depiction an arrow showing downward displacement of the dose syringe barrel and resulting gas in the form of bubbles floating upward.

Reference is now made to FIGS. 34-44 wherein syringe 220' (and other syringes 220 to follow) is accurately and precisely filled with only sterilized medicine 340. Initially, selected syringe 220' contains only a small volume of air (generally numbered 552). Initially, as seen in FIG. 34, stopcock 300 is closed and internal source assembly 280 is disposed in communication with selected syringe 220'. As a next step, as defined in action block 560, stopcock 300 is switched to an open state as seen in FIG. 35. In FIG. 36, barrel 386 of syringe 220' is rotated as indicated by arrow 562 to free finger flanges 388 from slots 462 (not shown in FIG. 36). Then barrel 386 of syringe 220' and internal source assembly 310 are displaced upward, as seen in FIG. 37 and as indicated by arrow 564, to an overfilled state as seen in FIG. 38 and returned downwardly in direction of arrow 564' a number of times (three is recommended) until air 552 resident in selected syringe 220' is totally evacuated into internal source assembly 280, as instructed in action block 570. Note, as seen in FIG. 39, air may be reformed as bubbles which float upward.

Once selected syringe is filled with sterilized medicine 340, barrel 386 is displaced downward to dispose finger flanges 338 in contact with an associated shelf 450 (see FIG. 23) as instructed by action block 580 in FIG. 16. So displaced, plunger button 438 is also disposed upon a stop

Figures 40, 41, 42, 43, 44:
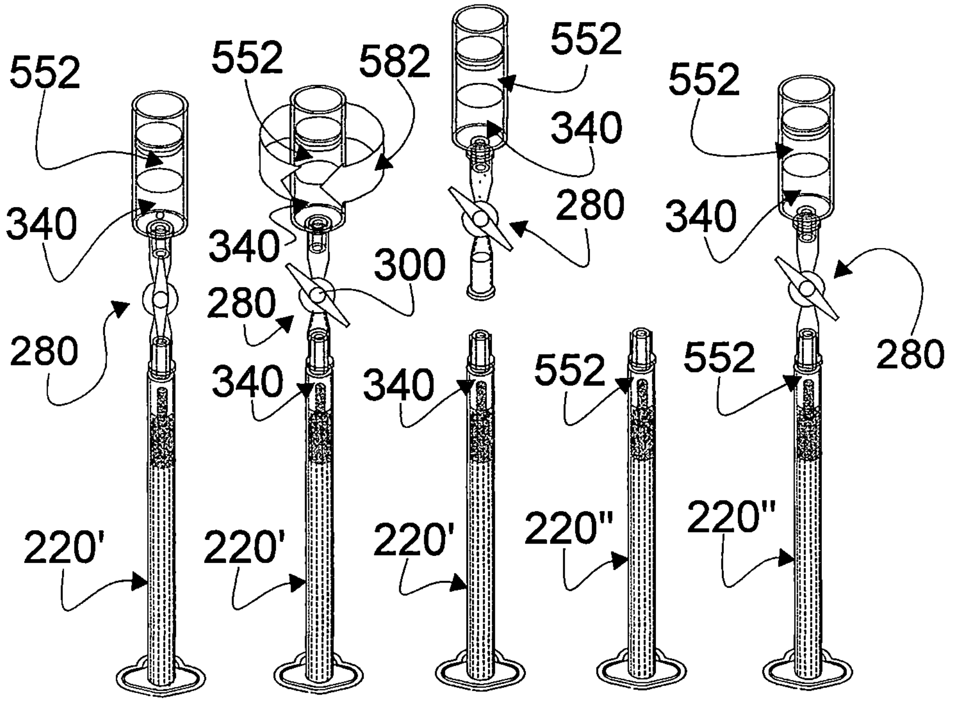
FIG. 40 is a depiction of a completion of filling of a dose into the selected syringe with a dose of liquid replacing gas originally in the syringe.
FIG. 41 is a depiction of the filled syringe seen in FIG. 40 with an arrow showing direction of rotation to displace selected syringe finger flanges into slot in the tray to affix the barrel and plunger rod button a precise distance apart to provide an accurately measured dose.
FIG. 42 is a depiction of detaching the interior source container from the last filled dose syringe.
FIG. 43 is a depiction of a next dose syringe selected for filling.
FIG. 44 is a depiction of the interior dose container being affixed to the selected next dose for filling.

452 (see FIG. 23B) which assures the predetermined desired volume of sterilized medicine 340 is resident in syringe 220' as seen in FIG. 40.

Then, as seen in FIG. 41, barrel 386 of selected syringe 220' is rotated as indicated by arrow 582 to affix finger flanges 338 back into slots 462 (not shown in FIG. 41) and stopcock 300 is closed as instructed in action block 590 of FIG. 16. Decision block 592 instructs a decision of whether all syringes are filled or all sterilized medicine 340 is displaced into syringes 220. If not, a next syringe 220" is selected (see FIG. 43) and internal source assembly 280 is affixed thereto, as seen in FIG. 44. If so, action block 594, for this example, instructs each filled syringe 220 to be capped.

Figure 45:
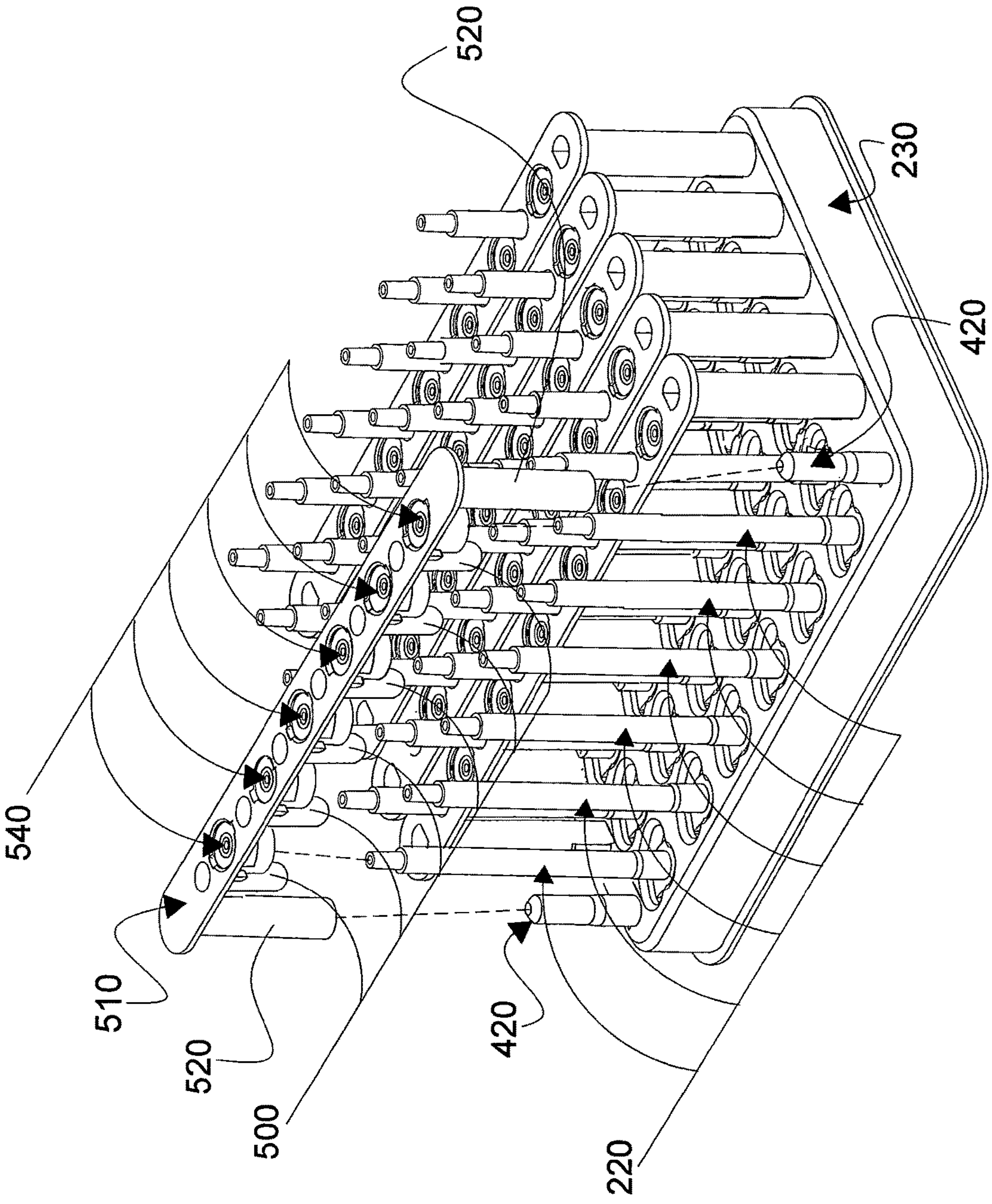
FIG. 45 is a perspective of a cap plate being displaced for capping a row of dose syringes after filling.
Figure 46:
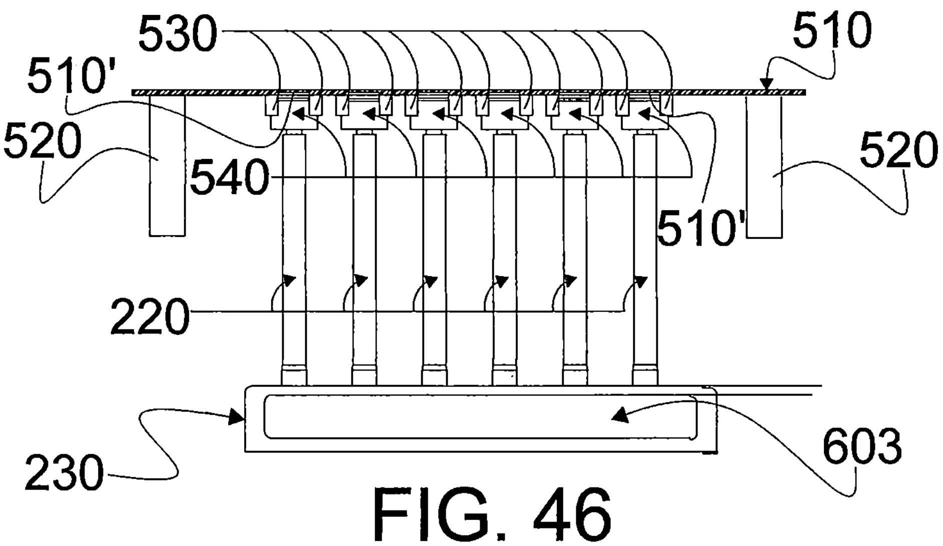
FIG. 46 is a lateral elevation of a cap plate with caps disposed affixed to filled dose syringes.
Figure 47:
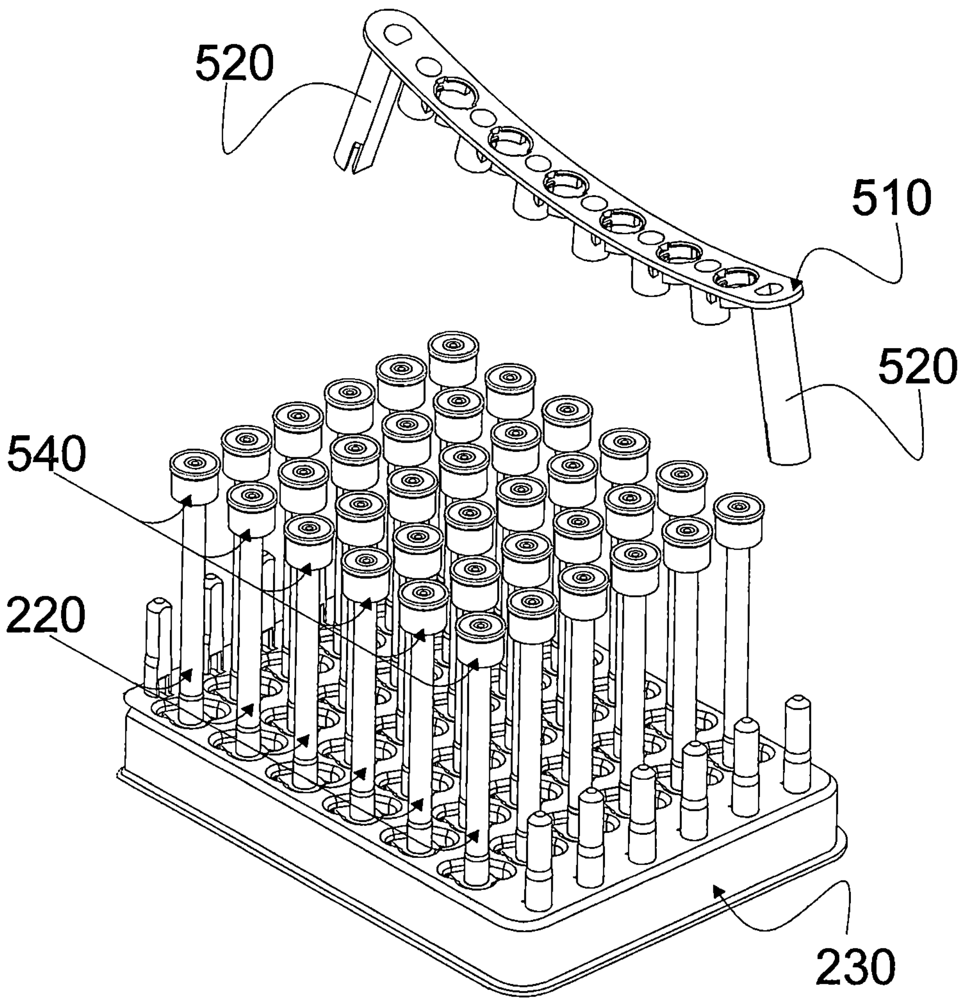
FIG. 47 is a perspective of a tray with cap plate free filled dose syringes and a bent cap plate displaying a method of detaching a cap plate from affixed dose syringes.

Reference is now made to FIGS. 45-47 wherein steps associated with syringe 220 capping are seen. A capping plate 510, as disclosed supra, is seen in FIG. 45 to comprise capping plate sections, each numbered 518, comprising a pair of stand-offs, each numbered 520, guides for holding each associated syringe barrels 386 in alignment (generally numbered 500), and a plurality of grip parts 530 (see FIG. 46) for releasibly holding each cap 540 in place until capping is accomplished. As seen in FIG. 45, capping plate 510 is displaced from each post 420 and displaced to align each cap 540 above a syringe 220. As seen in FIG. 46, each cap 540 is then, while being firmly held by grip parts 530, displaced onto an associated syringe 220. (Barrel guides 500 are not shown in FIG. 46 for clarity of seeing grip parts 530.) Once caps 540 are so disposed, when each syringe 220 is filled and capped, kit bag 210 can be opened as instructed in block 602 of FIG. 16 for access to filled syringes 220 for use in a potentially contaminating environment. Note also, a label 603 (seen in FIG. 46 without indicia) affixed to tray 230 for recording clinical patient and medicine data related to syringe 220 contents.

For individual filled syringe 220 use, capping plate 510 is released from each individual cap 540 by bending cap plate 510 as seen in FIG. 47. Such bending causes grip parts 530 to be displaced apart along the length of cap plate 510. Note thinned part 510' of cap plate in FIG. 46. Such displacement frees each cap 540 (and cap plate 510) such that each capped syringe 220 is then individually disengaged for being extracted from tray 230 for use.

Referring once more to FIG. 33, once all dose syringe 220 filling is completed, and before tray 230 with filled dose syringes 220 (see FIG. 17A) is accessed from kit bag 210, it is preferred that interior dose assembly 310 be capped and closed to prevent outlet flow. For this purpose, a luer cap 540' for capping female luer fittings is provided as seen in FIG. 33 for capping interior source assembly 310.

It should be noted that applications for inventions disclosed herein are examples of steps and associated methods for which other applications may be applied. In the examples, used for invention disclosure herein, two applications are apparent, a first being filling syringes for vitreous substitute injection and the second being for soaking pads for mitomycin use. In each of these cases, it is common for each complete associated convenience kit to be provided with items specifically required by the application.

As examples, for vitreous injections, which are generally required to be on the order of six to eight micro-liters, not only is it desired to have properly sized syringes, but also, due to the very small dose size, sharpened cannula which have no dead space when affixed to a syringe. For this reason, it is advisable to provide, as part of a general vitreous substitute convenience kit a zero dead space connecting cannula, such as the cannula 700 seen in FIGS. 48 and 49.

Similarly, for handling pads both before and after a procedure, it is also advisable to provide, as an example, a sealable medical capsule as seen in FIGS. 50-52 whereby a sterile enclosing capsule 800 is provided as seen closed in FIG. 50 and then opened with a pad 802 ready for being soaked in FIG. 51 and being soaked by being dripped upon by a predetermined volume 804 of mitomycin stored in a filled syringe 220 for wetting the pad 802 appropriately as seen in FIG. 52.

Figure 53:
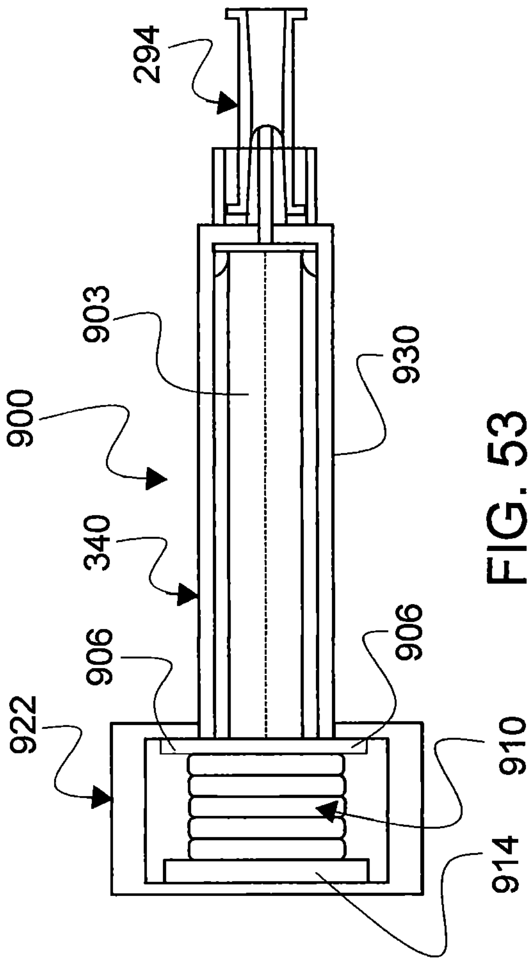
FIG. 53 is a side elevation of a horizontally disposed switchless, dripless liquid communicating device which employs a compression spring into a medical syringe into which liquid is drawn and contained after upon detachment from a liquid communicating source with dashed lines indicating elements of parts seen through clear plastic.

Reference is again made to FIG. 16 where steps 370, 560 and 590 instruct manually opening or closing a valve for the purpose of assuring maintenance of a dripless state each time a dispensing device is affixed and then disconnected from a receiving dose syringe 220. Such is the case when a valve is used to assure against sterilized medicine 340 loss. While use of valves have proved effective in medicine preservation within the scope of the instant invention, the two steps required at each syringe 220 fill are both time consuming and mentally challenging. The same purpose can be accomplished, for example, without requiring valve switching, using an internal source assembly which can be driplessly detached without closing a valve. Attention is drawn to FIGS. 53-55 wherein, as an example, a switchless, dripless internal source assembly 900 is seen. In FIG. 53, source assembly 900 is seen to comprise a compression syringe 340 compressibly affixed by a retainer 902 disposed about and removably retained by finger flanges 906.

In this example, retainer 902 engages a compression spring 910 mounted about a plunger rod 903 between a plunger rod thumb button 904 and finger flanges 906 of syringe 340. Internal source assembly 900 makes use of incompressibility of liquid (water based substance), relative density of air to water and hydrophobic properties of material in liquid conducting pathways to effectively restrain liquid flow and, thereby, resist spillage, as disclosed hereafter.

As delivered, for the dripless connector providing step, providing a stopcock, such as stopcock 300, which performs as said dripless connector when closed, stopcock 300 comprises digital control operations for opening and closing an inherent stopcock valve from outside said kit bag; whereby exemplary stopcock 300 use steps comprise:

- digitally opening stopcock 300 during said interior source assembly 310 filling step;
- and digitally closing stopcock 300 before disengaging a connection between stopcock 300 and said filter assembly 42';
- then opening stopcock 300 after engagement for displacement of sterilized medicine 340 into a dose syringe 220 thereafter and closing stopcock 300 before each following disengagement.

Switchless dripless assembly 900 is affixed to a filter assembly 42' in the same manner interior source assembly 280 is affixed to filter assembly 42'. As taught supra, there are two operational steps during which spillage can occur within the scope of the instant invention. The first step is detaching an internal source assembly from filter assembly 42', (see FIG. 30). This step occurs after initial internal source syringe filling, see action block 290 in FIG. 16. A second step occurs when displacing an internal source container from a just filled dose syringe 220 to an empty, ready to be filled dose syringe 220' (see FIGS. 42-43).

Figure 54:
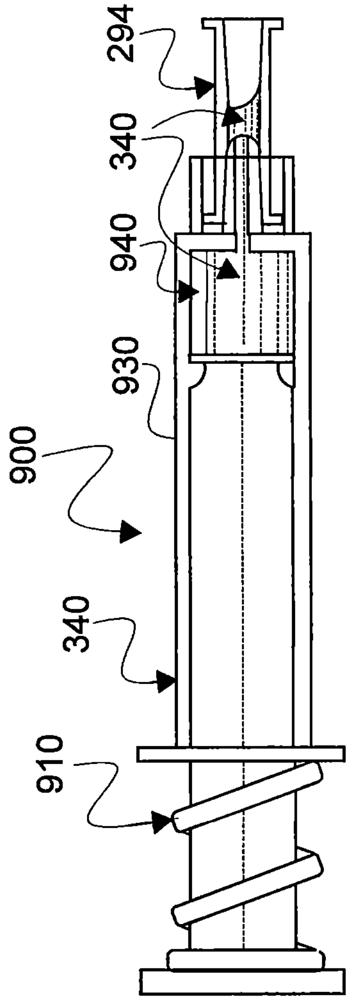
FIG. 54 is a side elevation of the horizontally disposed switchless, dripless liquid communicating device seen in FIG. 53 with the compression spring released and fluid disposed within the medical syringe.

To assure first step dripless operation, a compression spring 910, is compressibly disposed about a plunger rod 903, between a thumb button 914 and finger flanges 906 of syringe 340 as seen in FIG. 53. A retainer 922, affixed about plunger rod thumb button 914 and finger flanges 906, holds spring 910 in a compressed state. In practice, retainer 922 is removed just before sterilized medicine 340 is communicated into syringe 340, the result of which is seen in FIG. 54 where a bolus of sterilized medicine 340 and a small volume of air 940 is seen resident in barrel 930. It is preferable that compression spring 910 have a free length which provides a displacement in barrel 930 resulting in a greater volume than that of the bolus of sterilized medicine 340 and volume of air 940.

Figure 55:
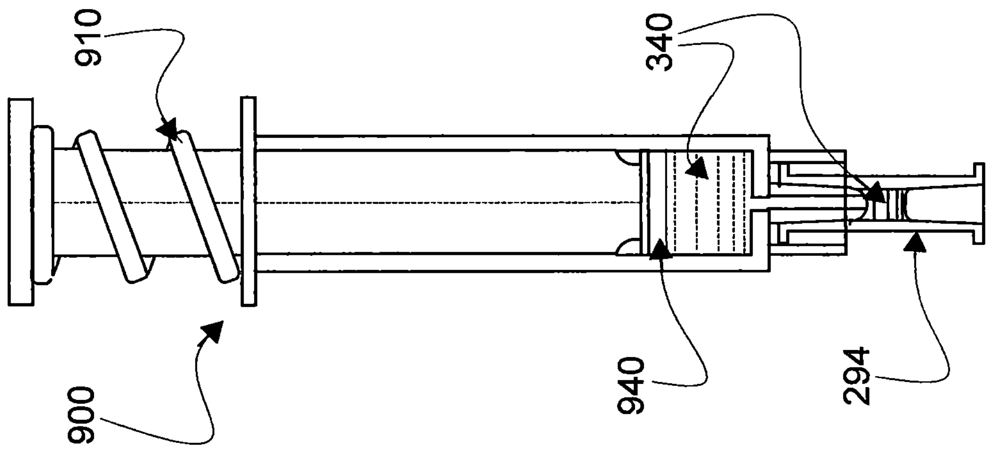
FIG. 55 is a side elevation of the switchless, dripless liquid communicating device seen in FIG. 54 rotated to vertical state.

When internal source assembly 900 is rotated to a vertical disposition, as seen in FIG. 55, the volume of air 940 is disposed above the bolus of sterilized medicine 340 and will continue to be so as sterilized medicine 340 is drawn from barrel 930 and replaced by air 940 as seen in FIGS. 35, 36, 37, 38, 39 and 40. Note that operations associated with FIGS. 34 and 41 are not applicable as stopcock (valve) opening and closing is not required. The combination of reduction of air 940 pressure by action of compression spring 910, surface tension of sterilized medicine resident in female/female fitting 294 along with material hydrophobicity of female fitting 294 yields a tendancy for resisting fluid flow into fitting 294 and, thereby, spillage resistance which has been found sufficiently effective that loss due to spillage has been determined to be in an acceptable range. As a further consideration, adjusting each plunger rod plunger 384 (see FIG. 24) to capture less volume of air at atmospheric pressure than dose volume of sterilized medicine 340 (see FIG. 42) further assures dripless operation.

Figure 21A:
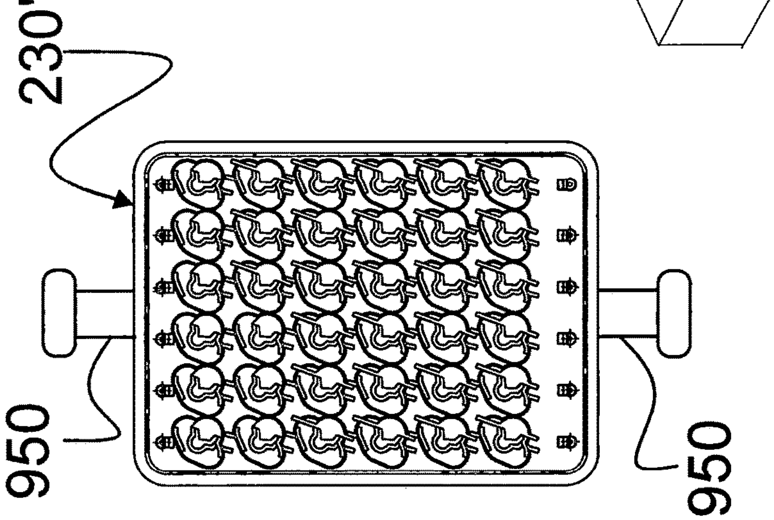
FIG. 21A is a top elevation of the tray seen in FIG. 21 with handles affixed whereby a tray disposed within a kit bag can be digitally anchored and stabilized.

An advantage of use of a switchless dripless assembly 900 is that syringe filling operation requires but a single hand (because no switch actuation in needed). Because one hand is thereby unused in syringe 220 filling, adding handles to tray 230, as seen to tray 230' in FIG. 21A, provides an opportunity to communicate digital force through kit bag 210 (to maintain in-bag sterility) against handles, commonly numbered 950, for anchoring and further stabilizing tray 230' during syringe 220 filling by the otherwise unused hand. Also, having digital force applied to tray 230' via a handle 950 provides for contemporaneous tray 230' displacement when affixing assembly 900 to a syringe 220.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for making and using a convenience kit for communicating raw medicine disposed in an exterior source vessel through a sterilizing filter of a filter assembly to provide for delivery of a quantity of sterilized medicine within sterile confines of a closed and sealed kit bag into a pre-sterilized kit bag interior source container and for testing SAL efficacy of said sterilizing filter before the sterilized medicine is accessed from said interior source vessel, comprising the following steps:

a. providing:

(i) said exterior source vessel comprising a dispensing fitting for being affixed to an exposed sterilizing filter fitting whereby a desired quantity of raw medicine can be displaced through said sterilizing filter;

(ii) a desired quantity of raw medicine;

(iii) said kit bag being made from material which is sufficiently transparent to permit visual observation of items disposed within said kit bag, amply rugged to permit digital manipulation, by contact of the items only through the exterior of said bag (without said bag being breached), sufficiently large and sufficiently pliant to be permissive to desired in-bag item displacement and being sealable to assure retainment of a bag interior sterility state;

(iv) said filter assembly comprising a sterilizing medical grade filter, by which raw medicine introduced into said kit bag is sterilized to a desired SAL by being displaced there through, said sterilizing filter being disposed to receive the raw medicine outside said bag, and to dispense sterile medicine inside said kit bag via a fitting of said filter disposed through a hole in said bag which is closed and sealed by a gasket, about said hole, which also effectively securely affixes said filter assembly to said kit bag to thereby provide but one sterilizing pathway for displacing matter into said kit bag when closed and sealed; and (v) said interior source container, disposed within said kit bag and comprising a fitting for communicating with said filter assembly and adequate volumetric capacity for receiving and storing a desired quantity of the sterilized medicine;

b. acquiring said kit bag, affixing said filter assembly thereto, and displacing said interior source container therein;

c. closing said kit bag and sterilizing said kit bag and items disposed therein to a desired SAL;

d. filling said exterior source vessel with raw medicine;

e. affixing said exterior source vessel to said sterilizing filter of said filter assembly;

f. affixing said interior source container for communicating with said sterilizing filter inside said kit bag;

g. displacing the raw medicine, into said filter assembly, the raw medicine being sterilized and being communicated as sterilized medicine into said interior source container; and h. when the raw medicine displacing step is completed, displacing a bolus of air into said exterior source container and performing a "bubble test" to assure efficacy of said sterilizing filter and desired SAL of the sterilized medicine residing within said interior source container before sterilized medicine is displaced from said interior source container for use.

2. A method for modifying said convenience kit made according to claim 1 for filling each of a plurality of dose syringes with a precise volume of sterile medicine comprising the following steps:

modifying said affixing said interior source vessel to said filter assembly step to include a step comprising providing a dripless connector and disposing said dripless connector for communicating fluid between said filter assembly and said interior source vessel such that sterilized medicine displaced from said filter assembly is displaced through said dripless connector and then into said interior source vessel;

whereby said interior source vessel and associated dripless connector can be displaced from communicating with said filter assembly without inadvertent spillage of sterilized medicine.

3. A method for modifying said convenience kit made according to claim 2 comprising the following steps:

for the dripless connector providing step, providing a stopcock which performs as said dripless connector when closed, said stopcock comprising digital controls for opening and closing said stopclock from outside said kit bag; whereby stopcock use steps comprise:

digitally opening said stopclock during said interior source vessel filling step and digitally closing said stopcock before disengaging a connection between said stopcock and said filter assembly; and opening said stopcock after engagement for displacement of sterile medicine thereafter and closing said stopcock before each following disengagement.

4. A method for modifying said convenience kit made according to claim 2 comprising the following steps:

for the dripless connector providing step, providing a switchless, dripless internal source assembly.

5. A method for further modifying a convenience kit made according to claim 1 for use in filling and capping a plurality of pre-sterilized dose syringes, within said kit bag, comprising the following steps:

providing the following additional items for disposition within said kit bag:

(i) at least one dose syringe tray comprising a plurality of wells disposed in a predetermined pattern within said tray, each well of said plurality of wells comprising space and structure for receiving and holding a dose syringe upright when disposed therein, each said well providing:

a. a shelf for providing support for finger flanges of the dose syringe disposed thereupon;

b. latching slots for stabilizing the finger flanges upon the shelf such that an inserted syringe is maintained in a vertical state thereby; and c. a hole providing for a dose syringe plunger rod to be inserted and vertically disposed below said shelf, said hole comprising a catch which retards upward displacement of a plunger rod button of a vertically disposed dose syringe and further provides plunger rod button access to a bottom of the well which acts as a plunger rod stop which further provides for measuring volume of a dose resident in the dose syringe determined by distance between said shelf and said well bottom;

(ii) at least one capping plate comprising a plurality of cap grips being disposed in an array having the same dimensions and spacings as said predetermined pattern of wells of said tray, each cap grip being sized and shaped for receiving and holding a cap used for capping a dose syringe when disposed thereupon whereby one cap is provided for each dose syringe, said at least one capping plate further comprising a plurality of holes, each hole being offset from a cap grip and being sized and shaped for providing slidable support for a syringe barrel, while being spaced and distributed in a pattern having the same dimensions as said well pattern of said tray and further, said at least one capping plate comprising at last two holes for interfacing with plate supports for maintaining said at least one capping plate displaced a predetermined distance above said at least one tray and oriented such that, when disposed relative to a tray filled with dose syringes, slidable support is provided for each syringe;

(iii) at least two plate supports being affixed to said tray and disposed to sustain said plate above said tray such that dose syringes barrels disposed in wells of said tray and also disposed in syringe barrel holes of said plate are held in a vertical orientation;

completing kit assembly by displacing said additional items into said kit bag by the following steps:

(iv) displacing each of a plurality of dose syringes, into an associated well of said at least one tray, spout-up with plunger rod buttons disposed through said well holes and dose syringe flanges residing on said a shelf of the associated well;

(v) displacing said at least one cap plate with a barrel of each dose syringe disposed in a well of said at least one tray being displaced through one hole of said plurality of holes in each said at least one plate;

(vi) affixing said at least one tray to said at least one plate via said plate supports; and (vii) disposing said additional items in said kit bag;

(viii) closing and sealing said kit bag; and (ix) sterilizing said kit bag and contents to a predetermined SAL.

6. A method for using a convenience kit made according to claim 5 for use in filling and capping a plurality of pre-sterilized dose syringes, within said kit bag, for use in a medical procedure, comprising the following steps:

acquiring a raw medicine source and displacing a predetermined quantity of the raw medicine into said exterior container;

securely affixing said stopcock to an interior container for providing sterilized medicine containment for medicine received from said filter assembly;

displacing the predetermined quantity of raw medicine into said interior container via said stopcock and said filter assembly; and performing a "bubble test" to assure efficacy of said sterilizing filter;

if the "bubble test" proves lack of efficacy of said sterilizing filter, removing said filled medical syringe with questionably sterilized medicine from the kit bag for use in making another sterile preparation, as an exterior source syringe, with another previously unused convenience kit made for the same purpose, otherwise, capping said so filled syringe and displacing said filled and capped syringe outside said kit bag for effective use in a potentially contaminating environment;

if the "bubble test" proves efficacy of said sterilizing filter, closing said stopcock and disengaging said stopcock from said filter assembly and displacing said stopcock and proceeding to fill empty syringes by performing the following steps:

(1) selecting a first empty dose syringe to be filled;

(2) affixing said stopcock to the selected empty dose syringe and rotating barrel of the selected dose syringe in a first horizontal direction to free the barrel of the selected syringe from being latched;

(3) opening said stopcock for establishing an open fluid flow pathway from said interior dose syringe to the selected syringe;

(4) displacing the barrel of the selected empty dose syringe vertically up and down a predetermined number of times to prime all gas into the liquid streaming from said selected dose syringe and thereby filling said empty dose syringe with a portion of sterilized medicine resident in said interior source container;

(5) displacing the barrel downward to fully impose the plunger rod button against said stop in said well and seat the finger flanges upon said shelf of said well to limit sterilized medicine disposed in the selected syringe to a predetermined volume;

(6) closing said stopcock in preparation for disengaging said closed stopcock from the so filled dose syringe;

(7) if the last dose syringe is not the final dose syringe to be filled, selecting a next dose syringe to be filled, disengaging the stopcock and proceeding to step (2), otherwise, proceeding to step (8);

(8) disengaging each of said at least one plates from said associated supports and displacing and aligning caps disposed in cap grips with spouts of syringes and depressing each so displaced cap into a closing and sealing state upon an associated syringe; and (9) accessing said tray, with filled a plurality of filled and capped syringes, from said kit bag, each so filled syringe being ready for distribution and storage within a potentially contaminating environment before being used in medical treatment.

7. A method for using a convenience kit according to claim 6 comprising a step of acquiring vitreous substitute as said raw medicine for use in filling and capping a plurality of pre-sterilized dose syringes, within said kit bag, comprising the following additional steps:

providing a medical cannula sized and shaped for dispensing said vitreous substitute medicine in a medical procedure for each dose syringe, disposed within said kit bag, exterior to said kit bag, but being an item to be used as part of said kit whereby said kit is provided ready for use in patient treatment.

8. A method for using a convenience kit according to claim 6 comprising a step of acquiring mitomycin as said raw medicine for use in filling and capping a plurality of pre-sterilized dose syringes, within said kit bag, comprising the following additional steps:

providing a sterilized medical capsule for each dose syringe for holding a pad to be soaked by sterilized mitomycin, each said sterilized medical capsule being disposed exterior to said kit bag to provide a sterile field for a selected pad to individually receive a precise volume of mitomycin whereby only medicine in an amount required for a precise volume of use is dispensed from a pre-filled dose syringe thereby reducing waste of precious and expensive medicine.

9. A method for acquiring and disposing a syringe selected for use in a medical procedure from said tray, wherein said plurality of syringes being filled with sterilized medicine, capped according to claim 5 are distributed and stored, comprising the following steps:

accessing said tray;

rotating said selected syringe horizontally to free said selected syringe finger flanges from latches restraining said selected syringe upon an associated ledge;

then rotating said selected syringe vertically to free said selected syringe plunger button from said catch in said well in which said selected syringe is disposed;

and displacing said so freed selected syringe to the procedure site for use.

10. A method for modifying said convenience kit assembly, made according to claim 1, and using said modified convenience kit for displacing sterile medicine into a pre-sterilized syringe comprising the following steps:

for said interior container and releasible fitting providing step, providing a medical syringe to be used as said interior container, and an unattached syringe cap;

acquiring a raw medicine source and displacing a predetermined quantity of the raw medicine into said exterior container;

affixing said medical syringe for communicating with said filter assembly;

displacing the predetermined quantity of raw medicine into said medical syringe via said filter assembly; and performing a "bubble test" on said filter assembly to assure efficacy of said sterilizing filter before accessing said filled medical syringe from said kit bag for use; and conditionally selecting the next step from the following group of steps based upon filter test results:

if the "bubble test" proves lack of efficacy of said sterilizing filter, preferably removing said filled medical syringe with questionably sterilized medicine from the kit bag for use in making a sterile preparation, as an exterior source syringe, with another previously unused convenience kit made for the same purpose, otherwise, capping said so filled syringe and displacing said filled and capped syringe outside said kit bag for effective use in a potentially contaminating environment; and if the "bubble test" proves efficacy of said sterilizing filter, affixing said unattached cap to said filled medical syringe and displacing said so capped syringe from said kit bag for use.

11. A method for providing a convenience kit comprising a closed, sealed and sterilized plastic bag, for sterilizing and displacing a predetermined volume of raw medicine, which can be a hazardous drug, from a source container which is disposed exterior to the bag and releasably affixed to a medical grade sterilizing filter assembly which is securely affixed to said bag to thereby provide a sterilizing pathway for the liquid to be sterilized and communicated into an internal source container disposed within said plastic bag to be used thereafter without concerns for inadvertent spilling and associated contamination by spilled liquid when said exterior source container is detached from said sterilizing filter exterior to said bag and when said interior source container is detached from said filter assembly inside the plastic bag, comprising the steps of:

(i) providing:

the plastic bag comprising an opening through which bag contents can be displaced and an otherwise closed and shrouding surface comprising sufficient thickness to impede fluid displacement there through and ample surface area to permit the liquid to be displaced into said interior source container;

said filter assembly comprising a pair of extended length fluid communicating conduits providing a passageway to and from said filter; said interior source container comprising a liquid storage chamber and an orifice through which liquid is dispensed into and out of said chamber;

(ii) perforating and displacing one of said conduits through a section of said surface into said plastic bag;

(iii) providing components for constructing a fluid tight seal about said perforated section and so displaced conduit and affixing said components about the one conduit to enclose and seal the perforation of the section;

(iv) providing a first dripless connector having a fitting for being securely affixed to said exterior source container on one end and another fitting for being releasably affixed to a conduit of said filter assembly on the other end, thereby providing a detachable pathway for dispensing the raw medicine from said exterior source container into said filter assembly and a dripless detachment for disconnecting said exterior source container from said filter assembly;

(v) providing a second dripless connector securely affixed to said interior source container on one end and releasably affixed to a conduit of said filter assembly on the other end, thereby providing a detachable pathway for dispensing the raw medicine from said exterior source container through said filter assembly into said interior source container and a dripless detachment for disconnecting said interior source container from said filter assembly to provide an untethered source container which is able to transport a liquid source free of any connection within said bag;

(vi) closing and sealing said opening to prevent fluid flow there through; and sterilizing the bag and contents therein.

12. A method according to claim 11 wherein said interior source container is a medical syringe with a dripless connecting device affixed thereto.

13. A method according to claim 11 wherein the providing steps comprise providing at least one medical syringe and a cap for each of said at least one medical syringe and disposing each at least one medical syringe and associated cap within said bag before closing and sealing said opening.

14. A further method according to claim 11 comprising a further step wherein a predetermined volume of liquid is dispensed through an exterior, exposed conduit of said filter assembly, sterilized and further dispensed into a sterile chamber of a selected medical syringe and the so filled medical syringe is capped while disposed in the sterile environment of said closed presterilized bag to preserve the aseptic state of the liquid for later delivery into a potentially contaminating environment.

15. A method according to claim 14 wherein, after capping and sealing closed each so filled and capped vessel, a bubble test is performed on said filter to assure efficacious operation of said filter before said bag is opened for access to the vessels for use in medical treatment.

16. A method according to claim 14 comprising a further step of disposing said convenience kit in a potentially contaminating environment prior to the liquid dispensing step without affecting desired SAL of liquid filled into each dose syringe.

17. A method according to claim 11 wherein said contents comprise a tray which provides a receptacle, for holding and stabilizing said plurality of vessels being dose syringes and as an additional providing step, each said dose syringe being displaced into the receptacle prior to the step of closing and sealing the opening.

18. A method according to claim 11 wherein the content providing step comprises providing components which are all radiation stable.

19. A method according to claim 11 wherein said tray providing step comprises providing a tray comprising compartments whereby dose syringes disposed within said compartments are separately disposed with spout being upright.

* * * * *